United States Patent
Lin et al.

(10) Patent No.: US 8,020,919 B2
(45) Date of Patent: Sep. 20, 2011

(54) TRIM DOOR HARDWARE CARRIER AND METHODS OF ASSEMBLING VEHICLE DOOR

(75) Inventors: Jih Cheng Lin, Farmington Hills, MI (US); Dennis John Buening, Northville, MI (US); Radoslav Bokun, Windsor (CA); Manfred Fritsch, Ringgold, GA (US); David James Krysiak, Pleasant Ridge, MI (US); Daniel E. Wenglinski, Livonia, MI (US); Juliusz Kirejczyk, Newmarket (CA); Luc R. Regnier, Toronto (CA); David Legault, Windsor (CA); Douglas G. Broadhead, Brampton (CA)

(73) Assignee: Intier Automotive Closures Inc., Newmarket, Ontario (CA)

( * ) Notice: Subject to any disclaimer, the term of this patent is extended or adjusted under 35 U.S.C. 154(b) by 381 days.

(21) Appl. No.: 10/585,628

(22) PCT Filed: Feb. 7, 2005
(Under 37 CFR 1.47)

(86) PCT No.: PCT/CA2005/000152
§ 371 (c)(1),
(2), (4) Date: Oct. 21, 2009

(87) PCT Pub. No.: WO2005/075226
PCT Pub. Date: Aug. 18, 2005

(65) Prior Publication Data
US 2010/0146862 A1 Jun. 17, 2010

(51) Int. Cl.
*B60J 5/00* (2006.01)
(52) U.S. Cl. .................................. 296/146.7; 296/146.1

(58) Field of Classification Search ............... 296/146.1, 296/146.5, 146.6, 146.7; 49/501, 502, 503
See application file for complete search history.

(56) References Cited

U.S. PATENT DOCUMENTS 6,381,906 B1  5/2002 Pacella et al.
6,510,657 B1  1/2003 Bertolini et al.
(Continued)

FOREIGN PATENT DOCUMENTS
DE  201 14 907 U1  1/2003
(Continued)

OTHER PUBLICATIONS

European Search Report Dated Apr. 1, 2010; English abstract for DE 10352236 (A1) which is also published as DE 20218678 (U1); English abstract for DE 20114907 (U1); English abstract for EP 1275540 (A2).
(Continued)

*Primary Examiner* — Lori L Lyjak
(74) *Attorney, Agent, or Firm* — Miller Canfield

(57) ABSTRACT

A door module assembly for a motor vehicle door has a plate-like carrier holding a plurality of door hardware components in a pre-configured orientation, including one or more window regulator rails. The carrier seals the motor vehicle door and includes a flap that provides at least partial access to the window regulator rails. A first trim panel is pre-fixed to the carrier. A second trim panel articulates with respect to the first trim panel between an initial position generally parallel to the first trim panel and an installed position generally in-line with the first trim panel. With the carrier storing substantially all of the hardware required for the door and the trim panels covering substantially the entire surface area of the door, handling and assembly operations are minimized.

3 Claims, 28 Drawing Sheets

U.S. PATENT DOCUMENTS

| | | |
|---|---|---|
| 6,615,475 B2 | 9/2003 | Berta et al. |
| 6,615,546 B2 | 9/2003 | Furuyama et al. |
| 2004/0012226 A1 | 1/2004 | Morrison et al. |

FOREIGN PATENT DOCUMENTS

| | | | |
|---|---|---|---|
| DE | 202 18 678 U1 | | 2/2003 |
| EP | 1 043 182 A1 | | 10/2000 |
| EP | 1 213 167 A2 | | 6/2002 |
| EP | 1 275 540 A2 | | 1/2003 |
| WO | WO 00/63039 A1 | | 10/2000 |
| WO | WO 01/25039 A1 | | 4/2001 |
| WO | WO 02/076776 A1 | | 10/2002 |
| WO | WO 03/057519 | | 7/2003 |

OTHER PUBLICATIONS

International Search Report and Written Opinion for PCT/CA2005/000152 Dated May 26, 2005.

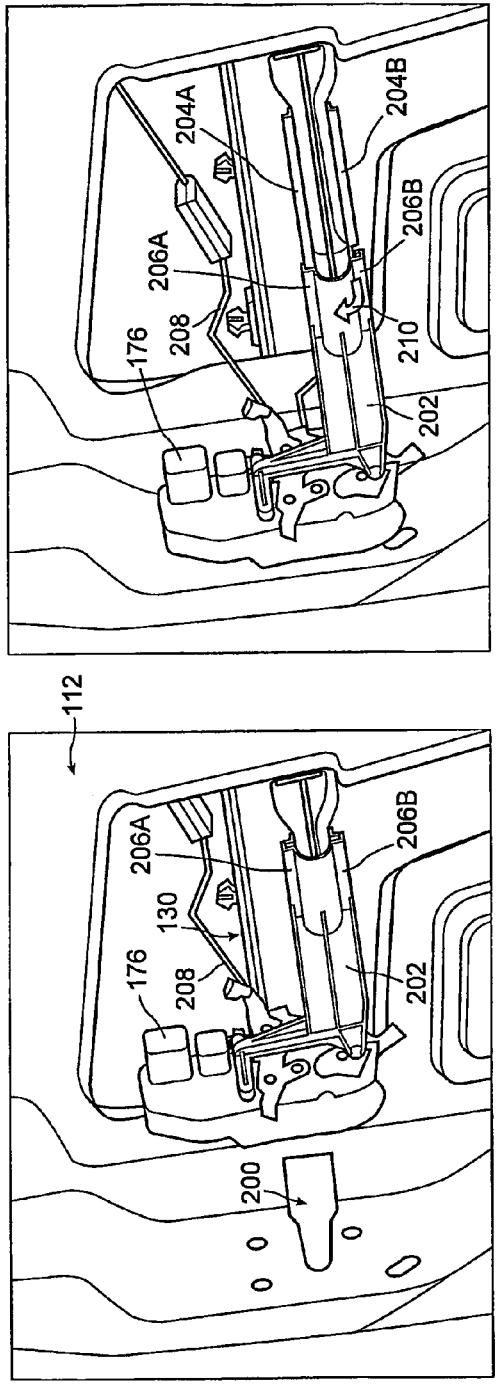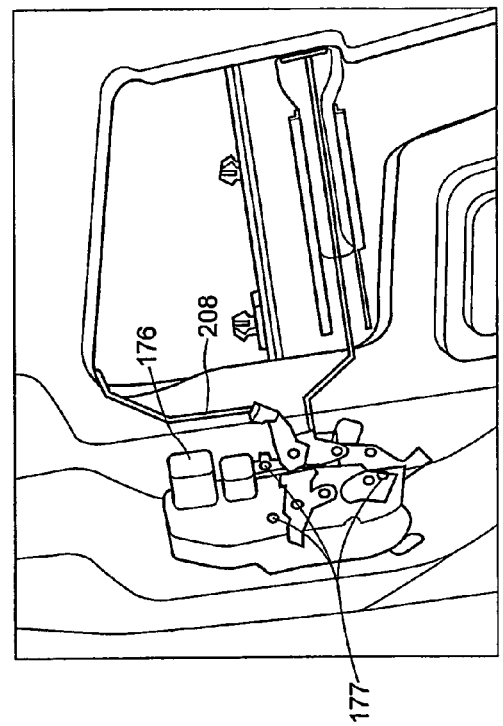

TRIM DOOR HARDWARE CARRIER AND METHODS OF ASSEMBLING VEHICLE DOOR

FIELD OF THE INVENTION

This invention relates to a door module assembly for a motor vehicle door. More particularly, the invention relates to a door module comprising a hardware carrier and door trim panels that are pre-fixed to the carrier in order to minimize subsequent assembly operations. The invention also relates to methods for assembling such a motor vehicle door.

DESCRIPTION OF RELATED ART

A motor vehicle door typically includes a structural door body having an outer sheet metal panel and an inner sheet metal panel, a plurality of hardware components mounted within an inner cavity formed between the outer and inner sheet metal panels, and an interior trim panel. The complete assembly of the door involves multiple manufacturing steps and numerous parts. Conventionally, an original equipment manufacturer (OEM) will install each individual hardware component and the trim panel to the structural door body along an assembly line.

The conventional installation of the hardware components has, however, several drawbacks. First, a high assembly cycle time is required to assemble the door in this fashion since installation of each hardware component is a separate task requiring human effort. Second, operability of the hardware components cannot be determined until the respective components are installed onto the door. Thus, time and labor may be wasted installing inoperable components. Third, additional time is required to inventory each hardware component as it arrives at the OEM to ensure that all of the hardware components are available for assembly.

Pre-assembled door modules have been proposed to overcome some of the deficiencies of conventional door assembly methods. A door module typically involves utilizing a carrier member to partially assemble and orient hardware components thereto prior to installation to the structural door body. One disadvantage associated with such door modules is that once the door module is installed to the door, the carrier member typically serves little or no purpose since all of the hardware components are eventually securely fastened to the structural door body.

U.S. Pat. No. 6,438,899 to Feder et al. discloses one example of a door module comprising a carrier plate for supporting a variety of mechanical and electrical door components, and having a portion of an interior trim. The carrier plate and the interior trim are formed as one structural unit and connected together by a foldable surface or flap. In this module, the carrier plate serves no purpose other than as a carrier. Furthermore, it is necessary to install separately a variety of additional components, including a window regulator and additional trim components. Moreover, there is no provision for a water management system.

Thus, there remains a need for a door module which minimizes assembly and handling operations.

SUMMARY OF THE INVENTION

One aspect of the invention, generally speaking, relates to a door module in which a hardware carrier also functions as a trim piece.

A method of assembling a motor vehicle door according to the first aspect of the invention includes the steps of affixing a plurality of hardware components to a secondary trim component to form a door module assembly. The door module assembly is attached to the structural door body. A primary trim panel is secured to the structural door body overlaying the door module assembly. The secondary trim component has a map pocket wall and the primary trim panel has a map pocket opening. When the primary trim panel overlays the secondary trim component, the primary trim panel cooperates with the secondary trim component to define a map pocket.

A door module assembly according to the first aspect of the invention comprises a primary trim panel having a map pocket opening and a secondary trim component having a map pocket wall. A plurality of door hardware components are affixed to the secondary trim component. The primary trim panel cooperates with the secondary trim component to define a map pocket when the trim panel overlays the secondary trim component.

A second aspect of the invention, generally speaking, relates to a door module assembly including a hardware carrier having a plurality of door hardware components affixed thereto and a trim component. The carrier and the trim panel each have parts of an interconnect structure for temporarily stacking the trim panel against the carrier for transport and delivery.

The hardware carrier is preferably a secondary trim component having a map pocket wall, wherein the trim panel cooperates with the secondary trim component to define a map pocket when the trim panel overlays the secondary trim component. The trim panel is preferably provided in upper and lower sections, with the lower section having the map pocket opening. The upper and lower trim panel sections each have parts of an interconnect structure for temporarily stacking the upper trim panel section against the lower trim panel section for transport and delivery.

According to the second aspect of the invention, a method is also provided for assembling a motor vehicle door having a structural door body, a plurality of hardware components, a secondary trim component, and a trim panel provided in upper and lower sections. The method includes: providing each of the upper and lowers sections of the trim panel with a finished surface intended to be observed from a passenger compartment, at least one of the panels having an opening therein; providing the secondary trim component wherein one side thereof has a finished surface area portion, the secondary trim component having a plurality of hardware components affixed thereto at locations other than the finished surface area portion; removeably attaching the upper trim panel section, the lower trim panel section and the secondary trim component against one another to thereby provide a unitized handling assembly; securing a portion of the handling assembly to the structural door body; removing the upper and lower trim panel sections from the handling assembly, securing any remaining hardware to the structural door body; overlaying the lower and upper trim panel sections in pre-configured orientation over the secondary trim component and securing the trim panels to the structural door body, the trim panel section having said opening cooperating with the secondary trim component such that the finished surface area of the secondary trim component covers the opening in the trim panel.

A third aspect of the invention, generally speaking, relates to a door module assembly wherein all of the trim components are pre-fixed to a hardware carrier, at least some of which may be moved between an initial position providing access to a structural door body and an installed position which covers up the structural door body.

A door module assembly according to the third aspect of the invention includes a plate-like carrier holding a plurality of door hardware components in a pre-configured orientation. A first trim panel is connected to the carrier. At least a second trim panel is joined to the first trim panel, preferably by way of an articulated linkage such as a hinge, and moveable between an un-installed position generally distanced from the carrier plate and an installed position generally flush with the first trim panel and overlapping the carrier plate.

A method of assembling a motor vehicle door according to the third aspect of the invention including includes provisioning a door module assembly having a preferably plate-like carrier, and upper and lower trim panels connected to the carrier. The carrier holds a plurality of door hardware components in a pre-configured orientation, including at least one window regulator rail. The lower trim panel is pre-fixed to the carrier. An upper trim panel is articulated to the lower trim panel, and is moveable between a position generally distanced from the carrier and an installed position generally flush with the lower trim panel and overlapping the carrier. The door is assembled by hanging the rail(s) on the inner sheet metal layer of a structural door body, thereby suspending the door module from the structural door body. The rail(s) are then fastened to the inner sheet metal layer and various hardware components are installed onto the structural door body. The upper trim panel is then moved into the installed position. With the carrier storing substantially all of the hardware required for the door and the trim panels covering substantially the entire surface area of the door, handling and assembly operations are minimized.

In the preferred embodiment, the carrier is substantially un-perforated and includes a sealing bead adjacent its periphery which co-operates with the inner sheet metal layer in order to seal the door from the external environment. The carrier, which is preferably formed from plastic, includes at least one hinge so as to provide at least one moveable flap. The window regulator rail(s) is accessible behind the flap(s).

A fourth aspect of the invention relates to a door module assembly for a motor vehicle door which has structural door body having inner and outer sheet metal layers that define a cavity therebetween, wherein the inner sheet metal layer includes at least one access opening to the cavity. The door module assembly includes a carrier plate having a plurality of door hardware mounted thereon. The carrier plate is formed from a substantially water-impervious material and sized to cover and seal the access opening(s) when the carrier plate is mounted to the inner sheet metal layer. A first trim panel is pre-assembled to the carrier plate prior to installation of the door module to the structural door body. At least one additional trim panel is pre-joined to the first trim panel prior to installation of the door module to the structural door body. The additional trim panel is moveable between a non-installed position which is distanced from the carrier plate and an installed position generally flush with the first trim panel and overlapping the carrier plate.

A fifth aspect of the invention relates to a motor vehicle door comprising inner and outer sheet metal layers joined together at their peripheries to define a cavity therebetween. The inner sheet metal layer has at least two relatively large holes therein providing access to the cavity and has a relatively large intervening surface between the two access holes. A door handle is fastened to the intervening surface of the dinner sheet metal layer. In order to prevent the intervening surface from acting as a hinge, the intervening surface includes a plurality of vertically-orientated ribs substantially covering the entire area of intervening surface.

BRIEF DESCRIPTION OF THE DRAWINGS

The foregoing and other aspects of the invention as well as the advantages thereof will be better understood by reference to the following detailed description when considered in connection with the accompanying drawings, wherein:

FIGS. 15A-15C are detailed perspective views illustrating various steps in mounting a latch onto the vehicle door according to the second embodiment;

DETAILED DESCRIPTION OF ILLUSTRATIVE EMBODIMENTS

FIGS. 1-6 show a first embodiment of the invention, FIGS. 7-17 show a second embodiment of the invention, and FIGS. 18-25 show a third embodiment of the invention.

Figure 1:
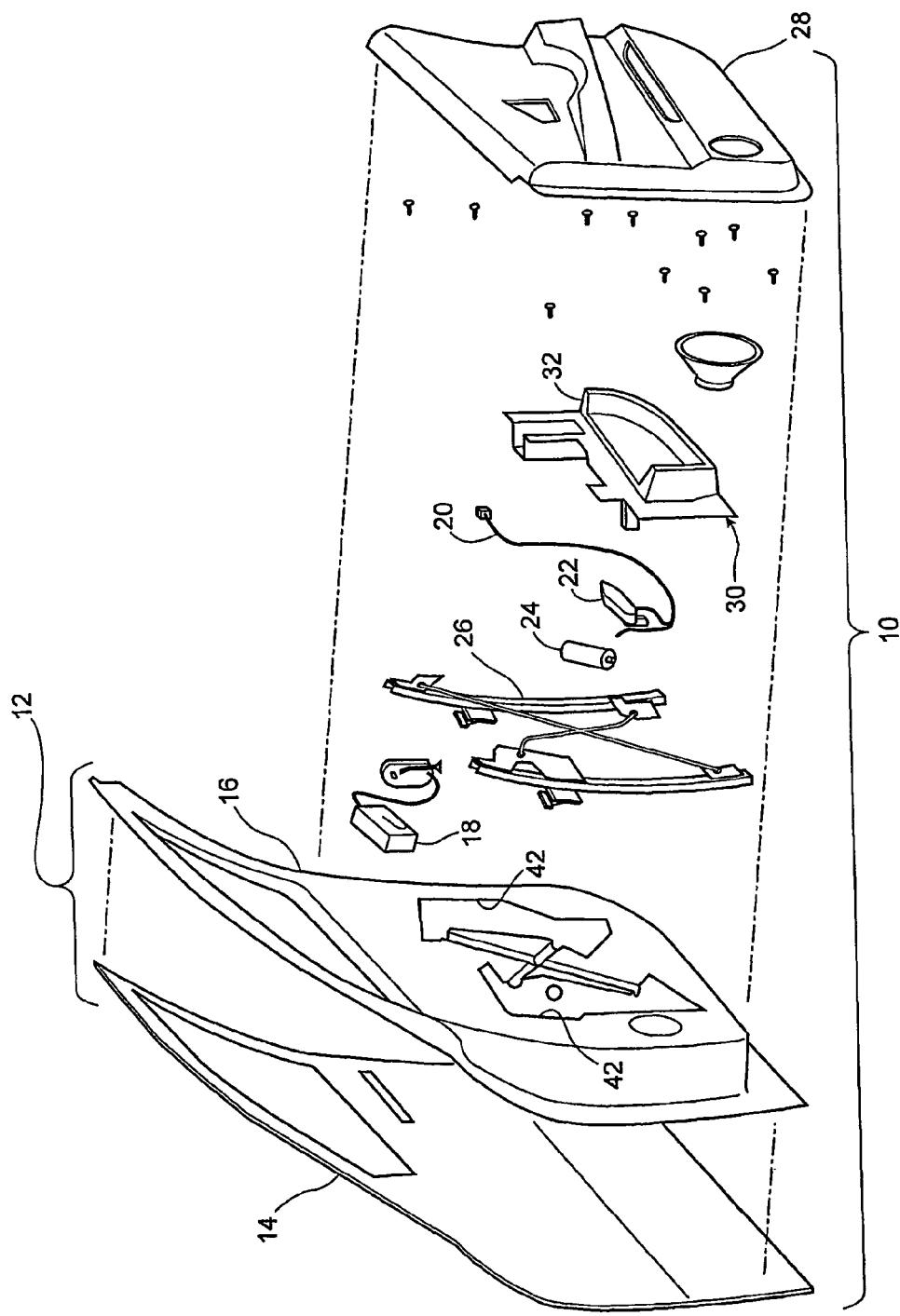
FIG. 1 is an exploded, perspective view of a motor vehicle door including a door module assembly having a secondary trim/hardware carrier component, according to a first embodiment of the invention.

Referring to FIG. 1 and the first embodiment, a motor vehicle door, generally shown at 10, includes a structural door body 12 having outer 14 and inner 16 sheet metal layers. A plurality of hardware components, including a power lock actuator and lock assembly 18, an inside release cable 20, an inside release handle 22, an electric motor 24, and a window regulator 26, are positioned between the outer 14 and inner 16 sheet metal layers when the door 10 is fully assembled.

A trim panel 28 is secured to and extends over the inner sheet metal layer 16 to provide an aesthetically pleasing appearance from the passenger cabin. The trim panel 28 is generally formed by a molding process, as is commonly known to one of ordinary skill in the art. Specific reference is made to U.S. Pat. Nos. 5,387,390; 5,397,409; 5,571,355; 5,885,662; 6,013,210; and 6,017,617. Trim panel 28 is contoured in the lower region to present a map pocket region. At the upper edge of this region, a map pocket opening 29 is provided. The opening 29 can be formed during the molding process or cut or trimmed after molding.

A secondary trim/hardware carrier component (alternatively referred to as a trim/carrier component for brevity), generally indicated at 30, is formed separately from the trim panel 28. Preferably, the trim/carrier component 30 is a map pocket component 32, which is formed as a relatively rigid piece separate from the trim panel 28. After complete assembly of the door 10, the map pocket component 32 is accessible to a motor vehicle occupant for storage of items.

Figure 2:
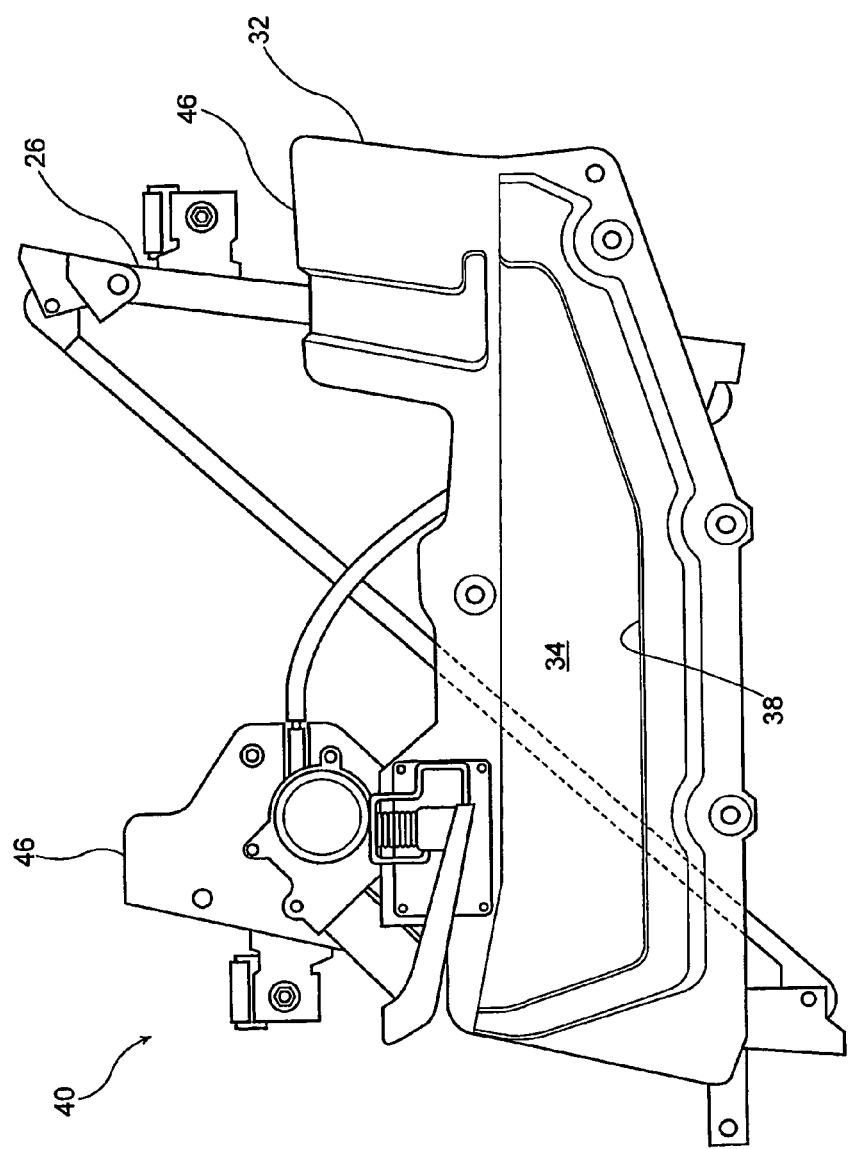
FIG. 2 is a front view of the door module assembly according to the first embodiment.
Figure 3:
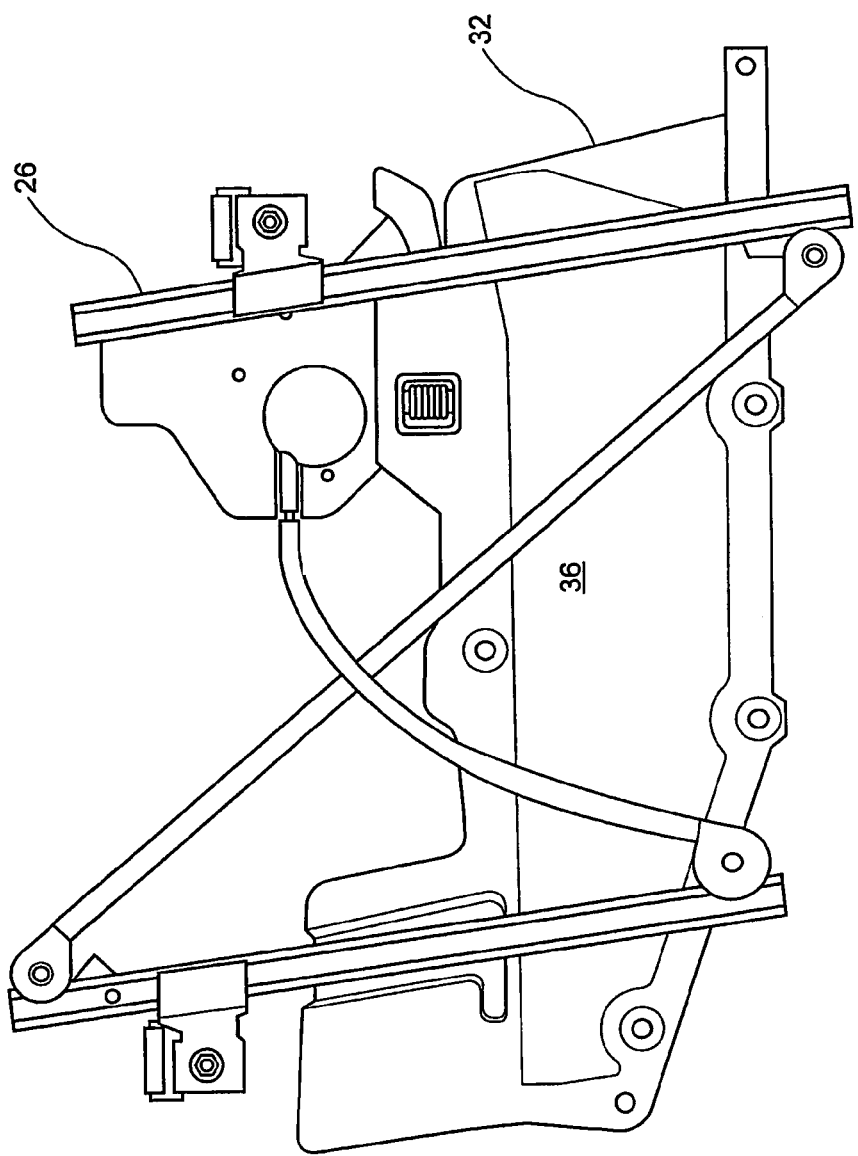
FIG. 3 is a rear view of the door module assembly according to the first embodiment.

Referring to FIGS. 2 and 3, the map pocket component 32 has an inboard surface 34 facing away from the outer sheet metal layer 14 (FIG. 2), and an outboard surface 36 facing the outer sheet metal layer 14 (FIG. 3). A U-shaped pocket wall or shelf structure 38 is formed along the inboard surface 34. Each of the plurality of hardware components is individually secured to the map pocket component 32 along the outboard surface 36 thereof to form a door module assembly, generally shown at 40. The door module assembly 40 is assembled away from the rest of the motor vehicle door 10. The map pocket component 32 is formed from a low cost "non-structural" material. This material provides enough structural integrity to enable the door module assembly 40 to be transported from a secondary assembly plant, where the door module assembly 40 is assembled, to an original equipment manufacturer (OEM), where the door module assembly 40 is mounted to the inner sheet metal layer 16. However, the non-structural material is not designed to permanently support hardware components under stress, such as the window regulator, once deployed.

As the hardware components are secured to the map pocket component 32 to form the door module assembly 40, each of the hardware components is also aligned along the map pocket component 32. Thus, when the door module assembly 40 is mounted to the inner sheet metal layer 16, each of the hardware components is correctly oriented relative to the rest of the door 10.

In addition, after the door module assembly 40 has been assembled (and before mounting of the door module assembly 40 to the inner sheet metal layer 16), each of the hardware components may be individually tested for operational use. As a result, when the door module assembly 40 is secured to the structural door body 12 by the OEM, operability of the each of the hardware components is ensured.

Figure 4:
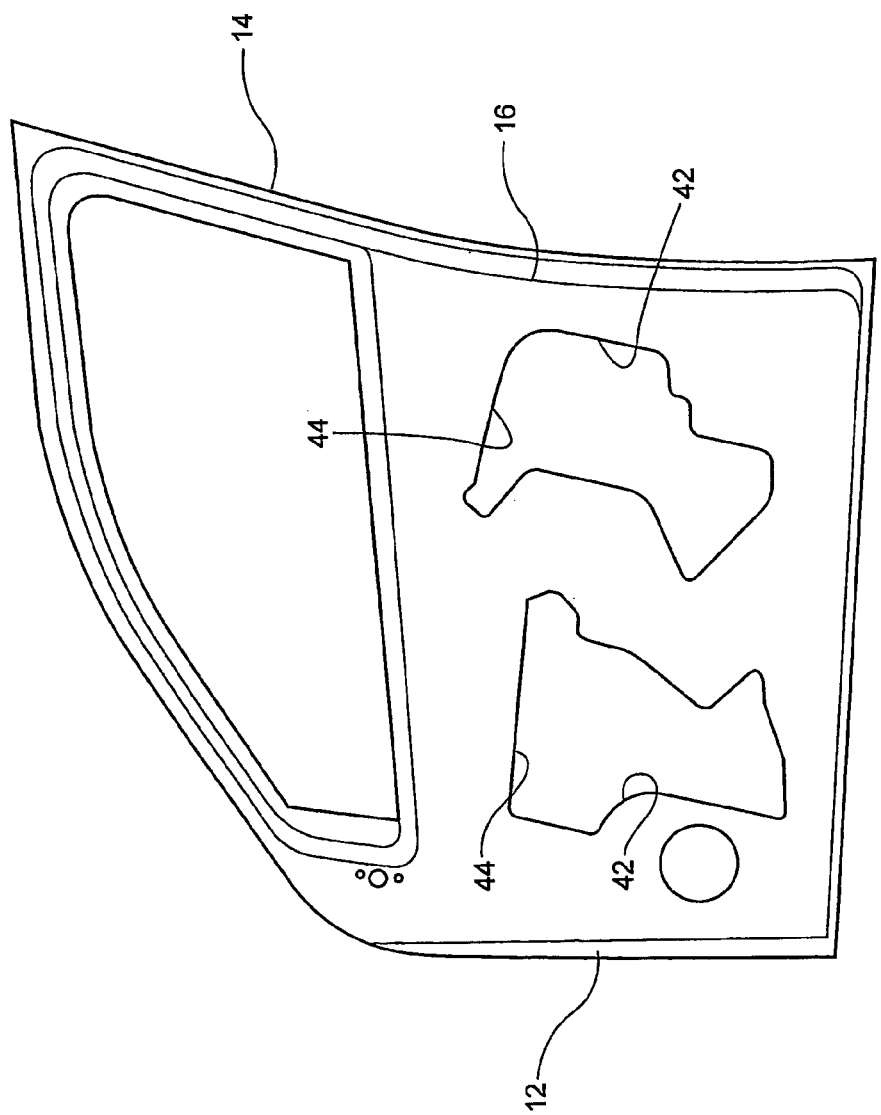
FIG. 4 is a front view of an inner sheet metal layer of the motor vehicle door including access holes for receiving the door module assembly according to the first embodiment.

Referring to FIG. 4, access holes 42 are formed in the inner sheet metal layer 16 for receiving the door module assembly 40. Any existing motor vehicle door may be easily modified for receiving the door module assembly 40 by forming the access holes by conventional means, such as stamping. It can be seen that two access holes 42 are formed, each having an irregular shape. It will be appreciated that both the number of access holes 42 and the shape of the access holes 42 may vary depending upon specific needs.

Figure 5:
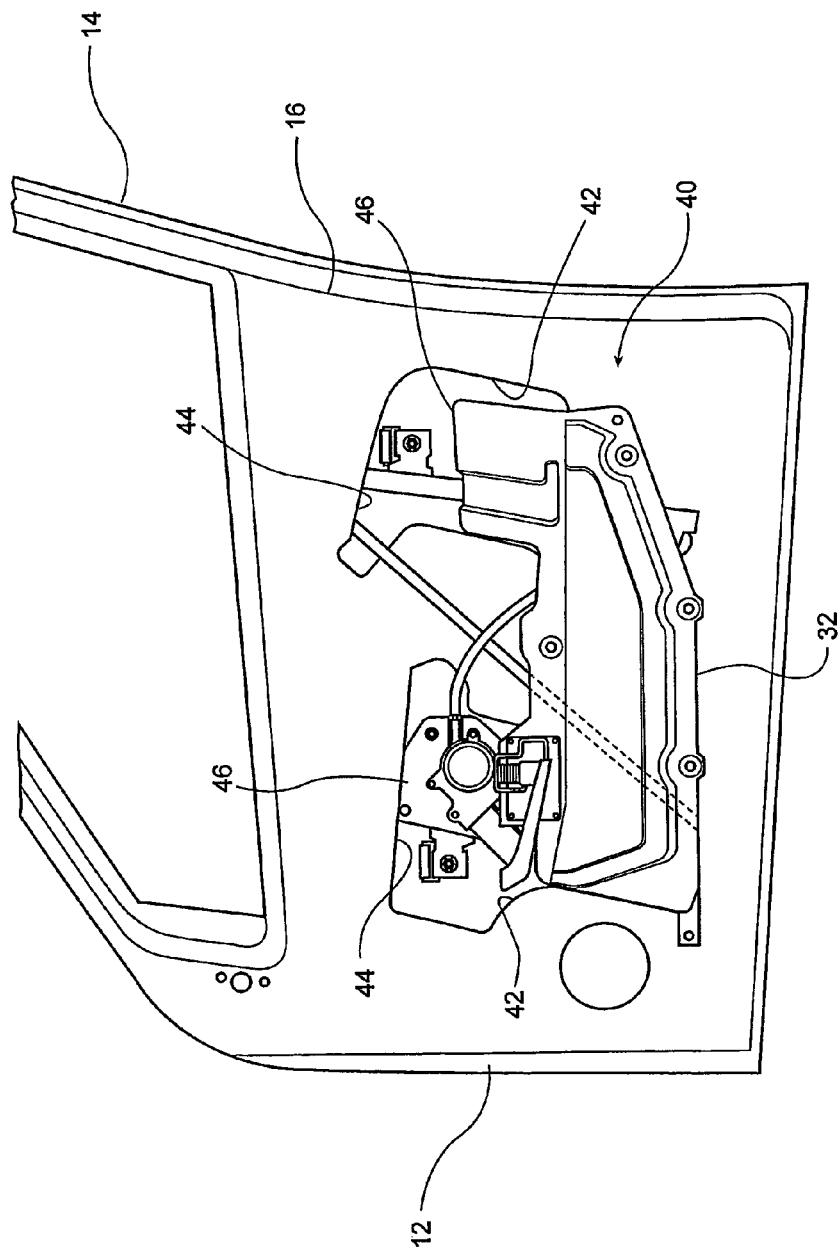
FIG. 5 is a front view of the inner sheet metal layer having the door module assembly secured thereto according to the first embodiment.

Referring to FIG. 5, the door module assembly 40 is at least partially inserted into the access holes 42 to secure the door module assembly 40 to the inner sheet metal layer 16. The door module assembly 40 may be secured to the inner sheet metal layer 16 by any conventional fasteners, such as bolts, screws, and the like. In the preferred embodiment, after the door module assembly 40 is mounted within the access holes 42, a top portion 44 of each of the access holes 42 above and outside of an upper surface 46 of the map pocket component 32 remains exposed. An individual servicing the hardware components may reach through the top portions 44 of the access holes 42 to gain access to the plurality of hardware components. Consequently, many servicing jobs may be completed without disrupting or dismantling the door construction, resulting in greater integrity of construction following servicing.

Figure 6:
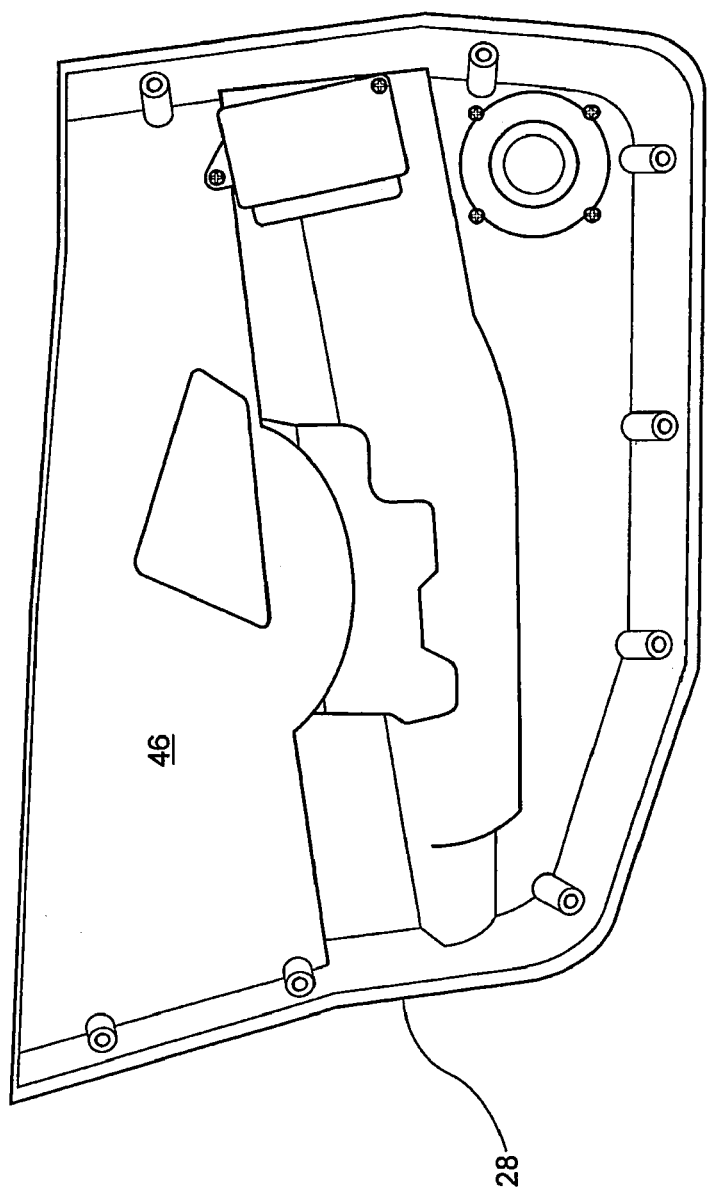
FIG. 6 is a rear view of a trim panel for affixing to the motor vehicle door according to the first embodiment.
Figure 7A:
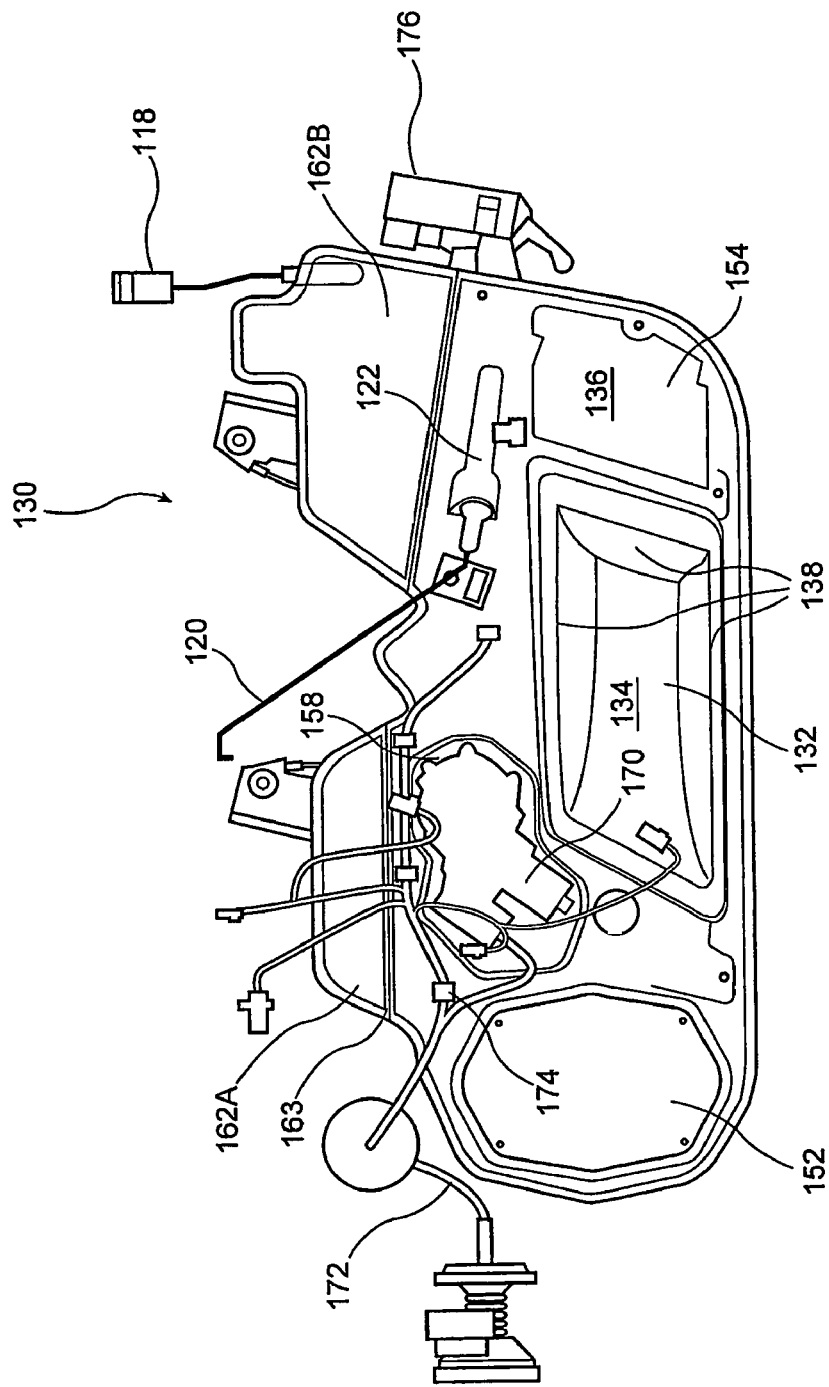
FIGS. 7A and 7B are front and rear views, respectively, of a secondary trim component/hardware carrier according to a second embodiment of the invention.
Figure 7B:
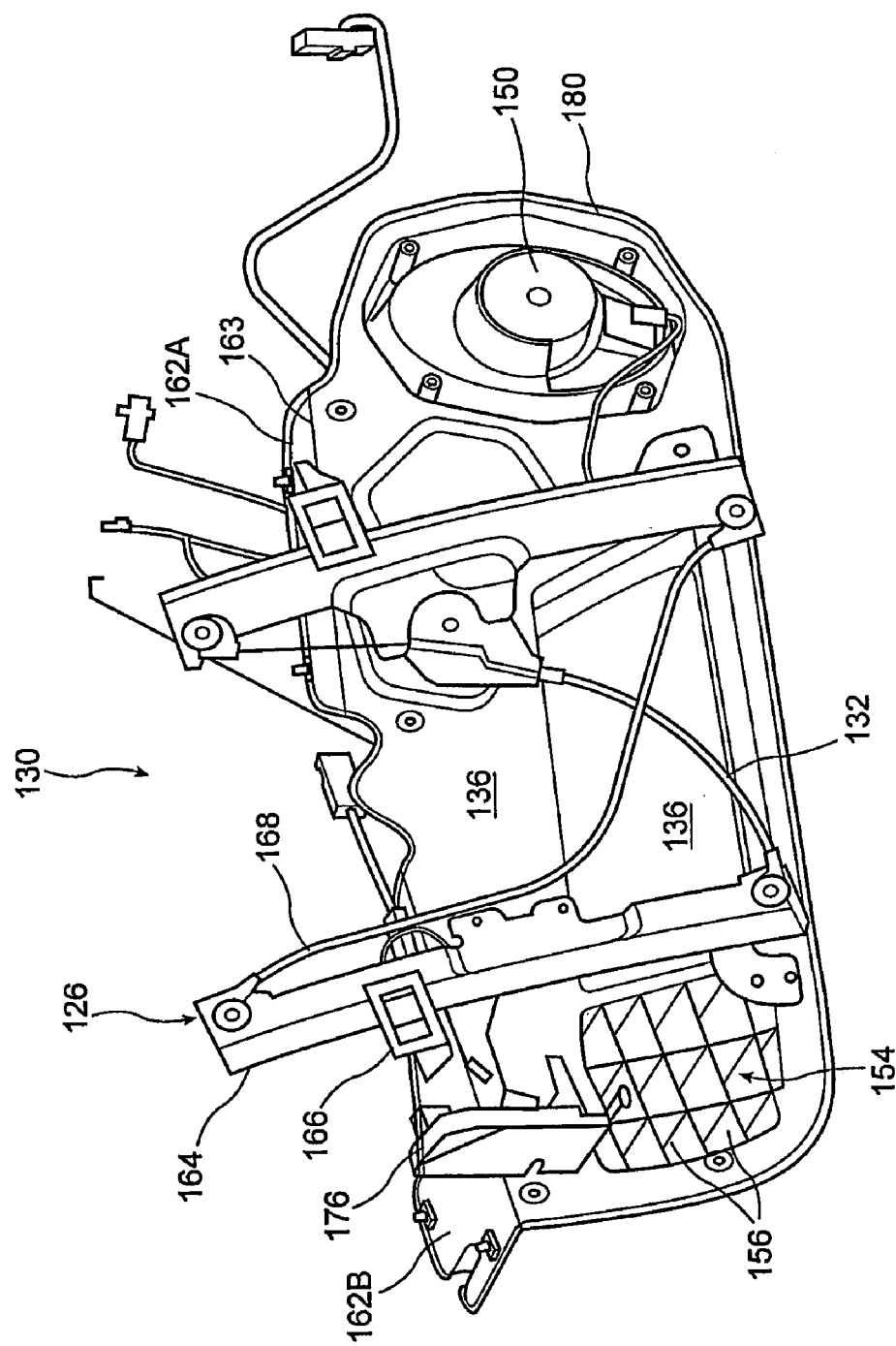

To complete assembly of the door 10, the trim panel 28, shown in FIG. 6, is then mounted over the inner sheet metal layer 16 such that an inner surface 48 of the trim panel 28 faces the inner sheet metal layer 16. The trim panel 28 overlays the door module assembly 40. Map pocket opening 29 aligns with the upper edge of the map pocket wall 38. Together, the trim panel 28 and the map pocket component 32 cooperate to define a map pocket.

A method for assembling the motor vehicle door 10 begins with securing each of the plurality of hardware components, including the inside release handle 22, the inside release cable 20, the power actuator and lock assembly 18, and the window regulator 26, and the wiring harness (not shown) 26, to the secondary trim component 30 to form the door module assembly 40. The secondary trim component 30 is formed separately from the trim panel 28. During attachment of the hardware components to the secondary trim component 30, the hardware components are aligned therealong so that the hardware components are properly oriented after complete assembly of the door 10. The access holes 42 are formed in the inner sheet metal layer 16 by stamping or other conventional methods. The door module assembly 40 is then at least partially inserted into the access holes 42 of the inner sheet metal layer 16 for mounting to the structural door body 12. The trim panel 28 is then secured over the door module assembly 40 to complete assembly of the door 10. If servicing of any of the hardware components is required, the trim panel 28 may be detached from the inner sheet metal layer 16 to expose the door module assembly 40, which is still mounted to the inner sheet metal layer 16. Access to the hardware components may be gained by reaching through the top portions 44 of the access holes 42, thus obviating the need for further disassembly of the door 10.

In another method for assembling the motor vehicle door 10, the method begins with securing each of the plurality of hardware components, including the inside release handle 22, the inside release cable 20, the power actuator and lock assembly 18, and the window regulator 24, wiring harness (not shown), to the map pocket component 32. The map pocket component 32 is formed separately from the trim panel 28. During attachment of the hardware components to the map pocket component 32, the hardware components are aligned therealong so that the hardware components are properly oriented after complete assembly of the door 10. The access holes 42 are formed in the inner sheet metal layer 16 by stamping or other conventional methods. The door module assembly 40 is then at least partially inserted into the access holes 42 of the inner sheet metal layer 16 for mounting to the structural door body 12. The trim panel 28 is then secured over the door module assembly 40 to complete assembly of the door 10. If servicing of any of the hardware components is required, the trim panel 28 may be detached from the inner sheet metal layer 16 to expose the door module assembly 40, which is still mounted to the inner sheet metal layer 16. Access to the hardware components may be gained by reaching through the access holes 42, thus obviating the need for further disassembly of the door 10.

A more sophisticated embodiment of the invention is shown in FIGS. 7-18. As seen in FIGS. 7A and 7B, the secondary trim/hardware carrier component of this embodiment, designated generally by ref. no. 130, includes a number of additional integrally molded or formed components in addition to a map pocket body 132. These additional components include: a speaker housing 150 and cover shroud 152; a side impact energy absorption structure 154, comprising a lattice of integrally molded plastic ribs 156; a cavity 158 for housing a motor and cable drum; a latch presenter rail 204, seen best in the detail view of FIG. 15B; and at least one flap 162 provided by "living" hinge 163, the illustrated embodiment having two such flaps 162A and 162B.

The trim/carrier component 130 of this embodiment includes a finished or visually pleasing "class A" surface 134 that is preferably consistent with the design theme used for the interior trim panels (described in greater detail below). A U-shaped pocket wall or shelf structure 138 is formed along the finished surface 134, collectively providing map pocket body 132. The remaining surface area 136 is not observable from the interior passenger compartment when the trim/carrier component 130 is installed and so can have a non-finished or non-class A surface to which a variety of hardware components are attached. The trim/carrier component 130 provides sufficient structural integrity to mount these hardware components for transport from a secondary assembly plant, as described in greater detail below, but does not otherwise aid or supplement the structural performance or characteristics of the structural door body (shown in FIG. 8), nor permanently support the hardware components under stress.

The trim/carrier component 130 carries all of the hardware components required for the typical vehicle door. These include:

a window regulator, generally designated by ref. no. 126, which includes one or more rails 164, lift plates 166 and interconnecting drive system 168 including motor and cable drum 170;

a wiring harness 172, which is attached to the secondary trim component 130 via integrally formed clips 174;

a lock assembly 118;

an inside release rod 120;

a speaker (not shown); and a latch 176;

In addition, the trim/carrier component 130 carries a water-sealing bead 180 around the perimeter thereof. A robot preferably applies the sealing bead 180, as known in the art per se. In the alternative, the seal can be an integrally formed part resulting, for example, from a foam co-injection process as known in the art. As another alternative, the seal can be a separately formed part that is friction-fitted into a detent formed around the outer perimeter of the trim/carrier component 130. However provided, the sealing bead 180 engages the inner sheet metal layer of the door structure when the former is installed on the latter as described in greater detail below. The trim/carrier component 130 thus provides a water shielding function, insulating the inner trim components and interior of the vehicle from the exterior environment. Consequently, the motor 170 is installed on the dry side of the trim/hardware component with only the gearbox output shaft extending into the wet side, and all of the electrical connections to the motor 170 and other electrical components are made or carried on the dry side.

Figure 9:
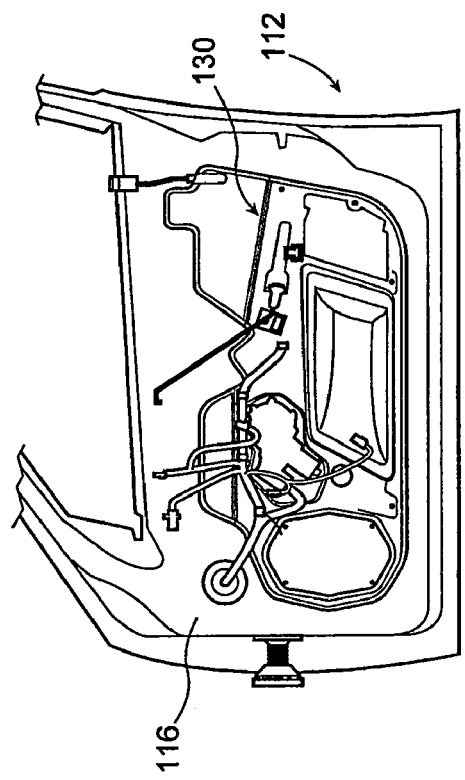
FIG. 9 is a front view of a partially assembled vehicle door according to the second embodiment.
Figure 8:
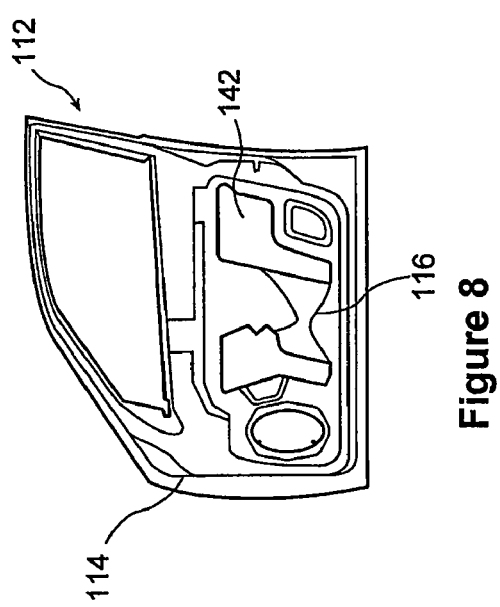
FIG. 8 is a front view of a vehicle structural door body onto which the secondary trim component is installed, according to the second embodiment.

The trim/carrier component 130 is mounted to a structural door body 112, shown in FIG. 8, which has outer and inner sheet metal layers 114, 116. Note that in this embodiment, access holes 142 in the inner sheet metal layer 116 will be covered up by the trim/carrier component when it is installed to the door body 112 as shown in FIG. 9 and discussed in greater detail below. However, since the trim/hardware component 130 includes at least one moveable flap 162, the interior space between the inner and outer sheet metal layers of the door body 112 can still be accessed to mount the hardware to the inner sheet metal layer 116 or to otherwise access hardware components disposed therein. See, in addition, U.S. Ser. No. 09/959,064 filed Apr. 19, 2000, the contents of which are incorporated herein in their entirety, for further information regarding the benefits provided by integrated flaps.

Figure 10:
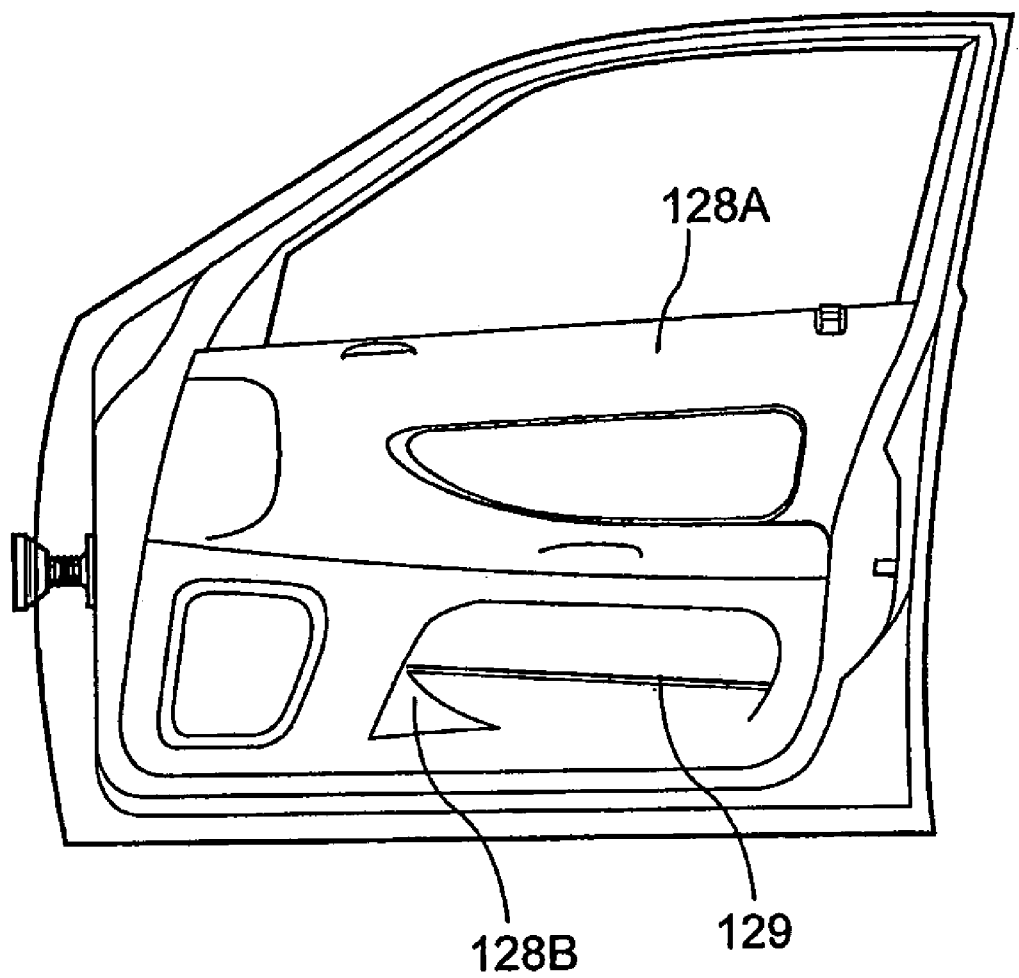
FIG. 10 is a front view of an assembled vehicle door according to the second embodiment.

As seen in FIG. 10, the interior trim in this embodiment is provided by separate upper and lower trim panels 128A, 128B that are co-operatively installed onto the vehicle door body 112, over the trim/hardware component 130. The lower trim panel 128B has a map pocket opening 129 which aligns with the upper edge of the map pocket wall 138 on the secondary trim component 130, thus cooperatively defining a map pocket.

Figure 11:
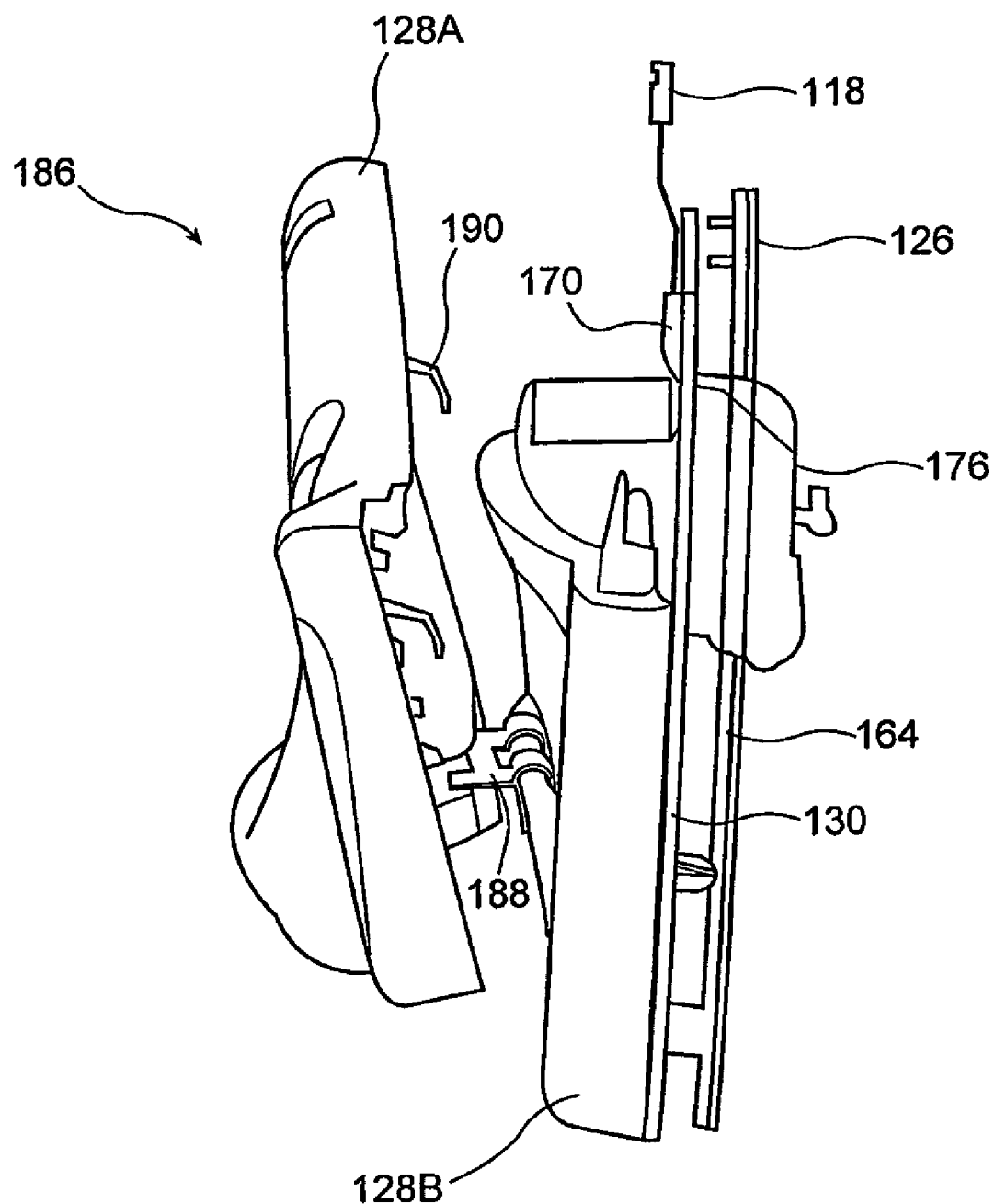
FIG. 11 is a side view of a transport unit for shipping the parts composing a door module assembly of the second embodiment.
Figure 12:
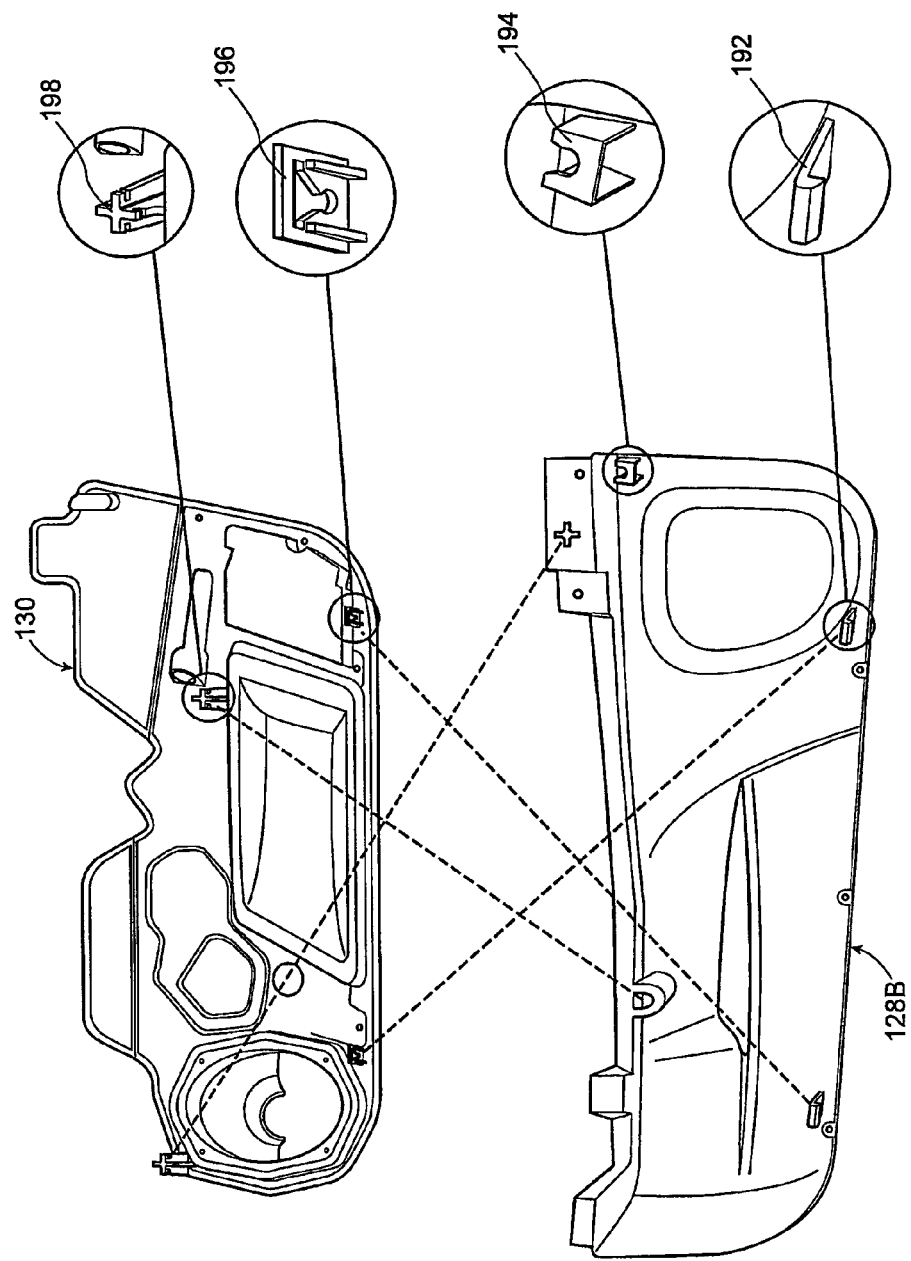
FIG. 12 shows front views of the secondary trim component and a lower trim panel of the door module assembly according to the second embodiment.

As seen best in FIG. 11, the trim/carrier component 130 (including accompanying door hardware), the upper trim panel 128A and the lower trim panel 128B, which collectively form a door module assembly 140, are provided as a single unit 186 for transport to an OEM from a secondary assembly plant. This architecture minimizes handling and assembly operations, as described in greater detail below. The transport unit 186 includes a releasable bracket 188 and hooks 190 for temporarily stacking the upper trim panel 128A on the lower trim panel 128B. The lower trim panel 128B, in turn, is releasably stacked against the trim/carrier component 130 by a friction-fit interconnect structure. More specifically, as seen in FIG. 12, the lower trim panel 128B includes integrally formed shipping clips or hooks 192 and pockets 194 on the rear face thereof, and the trim/carrier component 130 has corresponding integrally formed pockets 196 and hooks 198 on the front face thereof. The hooks 192 on the lower trim panel 128B mate with corresponding pockets 196 on the trim/carrier component 130 and the hooks 198 on the trim/carrier component 130 mate with corresponding pockets 194 on the lower trim panel 128B (as schematically indicated by the stippled lines). When stacked in this manner, the lower trim panel 128B is preferably offset against the trim/carrier component 130 so that the two parts may be easily separated.

The preferred door assembly sequence is as follows: Referring to FIG. 13A, the transport unit 186 is brought adjacent the door body 112 and the trim/carrier component 130 is located against the inner sheet metal layer 116. The trim/carrier component has integrally molded tubules 184 projecting from the rear side thereof which are designed to be inserted into corresponding holes in the sheet metal. (See the partial cross-sectional view of FIG. 16C). In the process, the hardware located on the trim/carrier component 130 is inserted at least partially into the access holes 142. The hardware is then secured to the inner sheet metal layer 116 by conventional fasteners such as bolts and screws, and the like. The flaps 162 on the trim/carrier component 130 may be utilized to gain access to the hardware located on the upper portion of the trim/carrier component 130.

In the preferred embodiment the latch 176 is installed into an opening 200 of the door body 112, as seen best in the detail perspective views of FIGS. 15A-15C. In order to ease assembly, the latch 176 is preferably temporarily mounted on a presenter 202 that is slidable on the trim/carrier component 130 between an initial, park position, seen in FIG. 15A, and an installed position, seen in FIG. 15C. In order to support this function, the trim/carrier component includes two integrally molded rails 204A, 204B. The presenter 202 includes two C-shaped channels 206A, 206B in its peripheral wall that glide on the rails 204A, 204B. The presenter 202 also includes one or more projecting pins (not explicitly shown) which support the latch 176 via bolt holes 177. Articulated rods 208 are used to connect the latch to other components such as the door handle. To mount the latch 176 against the door body, the presenter 202 is slid from the park position to the install position, where the latch is disposed and properly oriented adjacent the opening 200 in the door body 112. As the bolts are inserted into the boltholes of the latch, the support pins and hence the presenter are backed out of the bolt holes, enabling the presenter 202 to be easily removed from the latch 176. In addition, as one of the integral rails 204B is shorter in length than the other rail 204A, the presenter 202 may be removed from the secondary trim component 130 by an appropriate twisting motion, as symbolically represented by arrow 210.

Once the hardware on the upper part of the trim/hardware component 130 is secured to the door body 12, the upper trim panel 128A is removed from the transport unit 186. The hook 190 may be used to temporarily hang the upper trim panel 128A on the door body 112 in a position higher than the installed position, as seen in FIG. 13B.

Figure 13C:
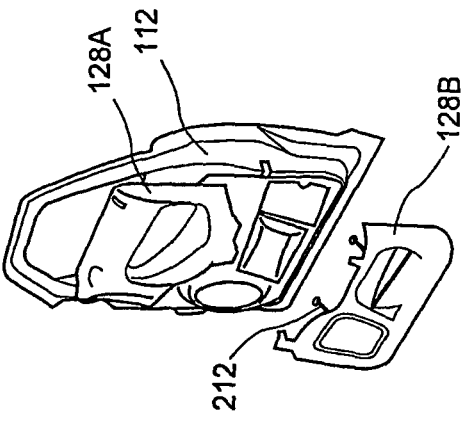
FIGS. 13A-13C are perspective views illustrating various steps in assembling the vehicle door according to the second embodiment.
Figure 14:
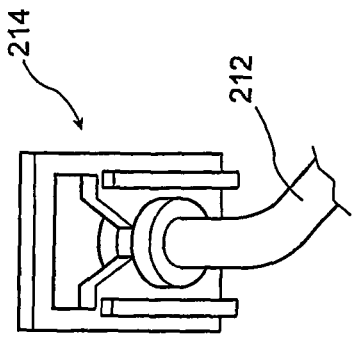
FIG. 14 is a detail view of a strap connector employed in the second embodiment.
Figure 13B:
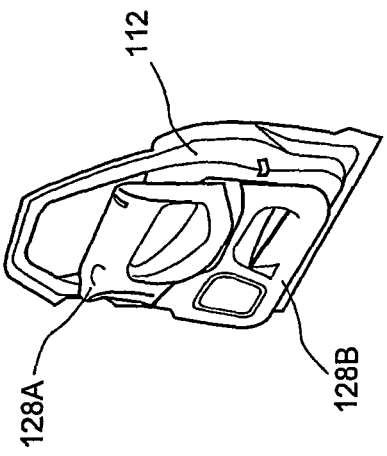
Figure 13A:
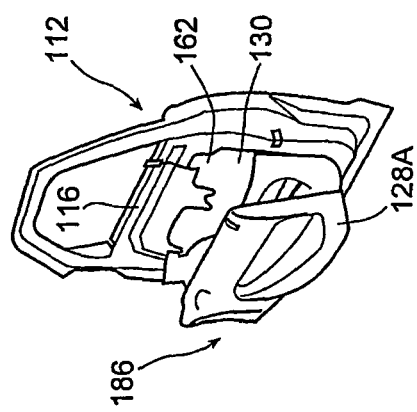
Figure 16C:
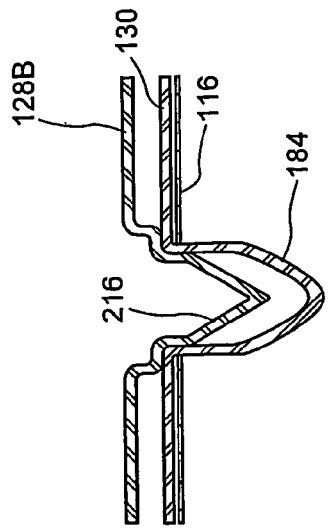
FIG. 16C is partial, detailed cross-sectional view of a panel locating structure employed in the second embodiment.
Figure 17:
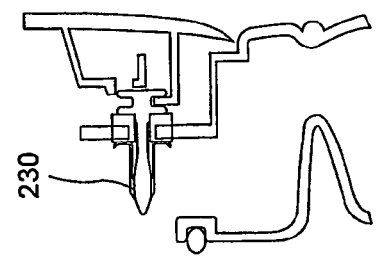
FIG. 17 is a partial, detailed cross-sectional view of a panel fastening structure employed in the second embodiment.
Figure 16A:
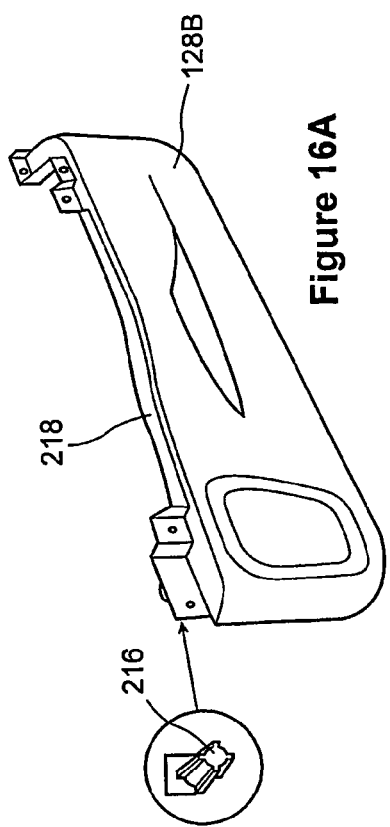
FIG. 16A is a second perspective view of the lower trim panel of the second embodiment, taken in isolation.
Figure 16B:
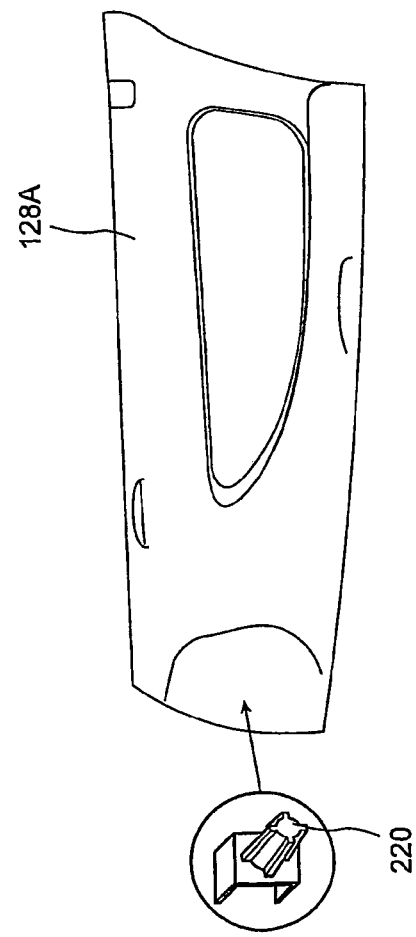
FIG. 16B is a perspective view of an upper trim panel of the second embodiment, taken in isolation.

Next, as shown in FIG. 13C, the lower trim panel 128B is removed from the trim/carrier component 130 by releasing the shipping clips. If desired, one dr more removable straps 212 may be used to interconnect the lower trim panel 128B with the trim/carrier component 130 in order to hang the lower trim panel from the door body 112 in an out-of-the-way position, leaving access to the lower portion of the trim/carrier component. (FIG. 14 shows one example of an interconnect structure 214 for securing a removable strap to a part.) The hardware components located on the lower portion of the trim/carrier component may then be secured to the inner sheet metal layer using conventional fasteners.

The straps 212, if employed, are then removed, and the lower trim panel 128B is located in a pre-configured orientation against the trim/carrier component 130. For this purpose the lower trim panel 128B preferably includes a series of integrally molded, keyed tubules 216 (shown in FIG. 16A) projecting from the rear side thereof which mate with slightly larger correspondingly-shaped tubules 184 in the trim/carrier component and/or holes formed in the inner sheet metal layer. See also the partial cross-sectional view of FIG. 16C. Each tubule/hole combination has a different key pattern, thus eliminating positional errors. Once located, the lower trim panel can then be secured to the inner sheet metal layer as known in the art per se. For example, the lower trim panel may include integrally molded clips or snap fasteners projecting from the rear side thereof for mating engagement in corresponding holes formed in the inner sheet metal layer.

Next, the upper trim panel 128A is located in a pre-configured orientation against the door body 112. More particularly, the lower trim panel 128B preferably includes a flange 218 having one or more of the locating tubules 216 thereon which will be covered from view by the upper trim panel 128A. The upper trim panel 128A preferably includes somewhat smaller locating tubules 220 on the rear side of its lower perimeter for co-locating the upper trim panel against the now-installed lower trim panel by insertion of the smaller tubules 220 into the larger tubule 216. Once located, the upper trim panel 128A is then secured to the inner sheet metal layer 116 using, for example, integrally molded clips or snap fasteners projecting from the rear side thereof which matingly engage corresponding holes formed in the inner sheet metal layer. The upper trim panel is also preferably secured to the lower trim panel at the overlapped flange 218 using clips such as clips 230 shown in the detailed sectional view of FIG. 17. The assembled door is shown in FIG. 10.

Once assembled, the hardware components can typically be serviced by removing only the upper trim panel to thus expose the flaps of the trim/carrier component. These flaps may then be Opened to allow access to various hardware components. For example, flap 162B can be opened to allow access to the latch 176. Advantageously, as the presenter 202 is discarded during installation, the latch can be easily removed for servicing by disconnecting the articulated rods and wiring harness.

Figure 18:
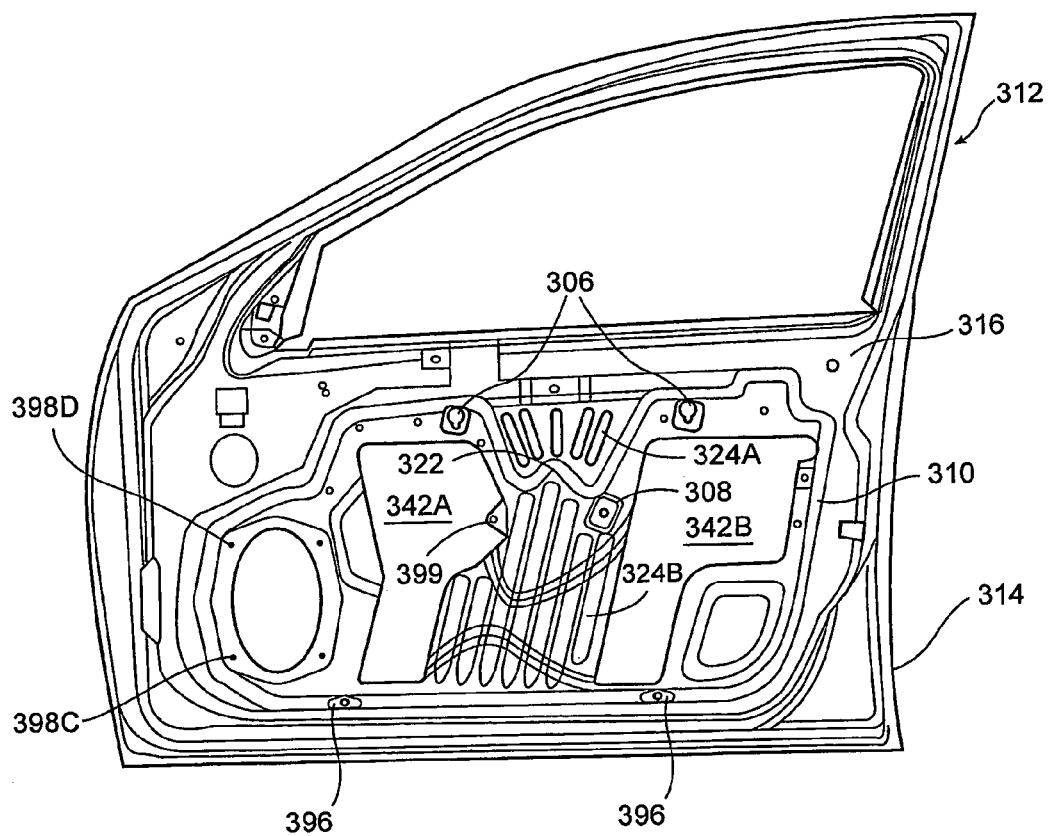
FIG. 18 is an elevation view of a structural door body according to a third embodiment.

FIGS. 18-24 show the most preferred embodiment of the invention. FIG. 18 shows a structural door body 312 comprising inner and outer sheet metal layers 316, 314. Access holes 342A and 342B are provided in the inner sheet metal layer 316. Keyholes 306 are provided above the access holes for mounting window regulator rails 364 to the inner sheet metal layer 316, as discussed in greater detail below. The inner sheet metal layer 316 presents a large surface area bridging the two access holes 342A, 342B, and includes a platform 308 which serves to structurally support a pull arm, as described in greater detail below. The inner sheet metal layer 316 also includes an irregularly shaped, closed loop plateau 310 surrounding the access holes. The plateau 310 provides a flat surface for sealingly mounting a secondary trim component/hardware carrier to the structural door body 312, as described in greater detail below. A portion 322 of the plateau 310 is shaped in the form of a "W" (i.e., wiggly shaped) between the two access holes 342A, 342B, thus substantially avoiding the presentation of any laterally extending surface. In addition, two series of generally vertically orientated ribs 324A, 324B are formed in the inner sheet metal layer 316 in the bridge area, above and below the wiggly-shaped portion 322 of plateau 310. Collectively, the ribs and the wiggly shaped portion of the plateau substantially cover the entire surface of the inner sheet metal layer 316 between the two access holes 342A, 342B so as to ensure that there is no consistent horizontal surface therebetween. In this manner, the inner sheet metal layer 316 does not provide a hinge that could arise as a result of the orthogonal forces applied to the pull arm platform 308.

Figure 19A:
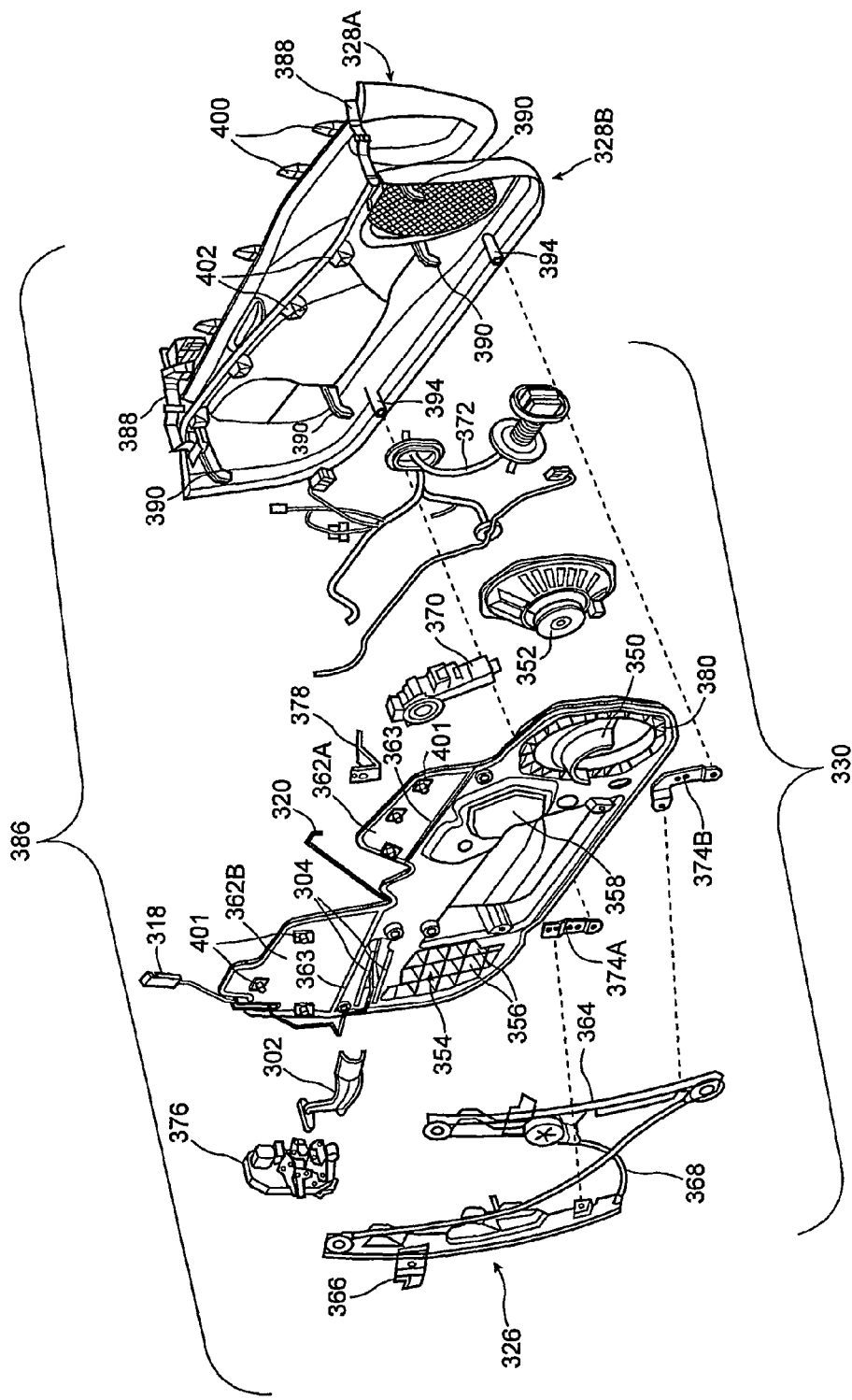
FIGS. 19A and 19B are exploded views, taken from opposite angles, of a secondary trim component/hardware carrier according to the third embodiment.
Figure 19B:
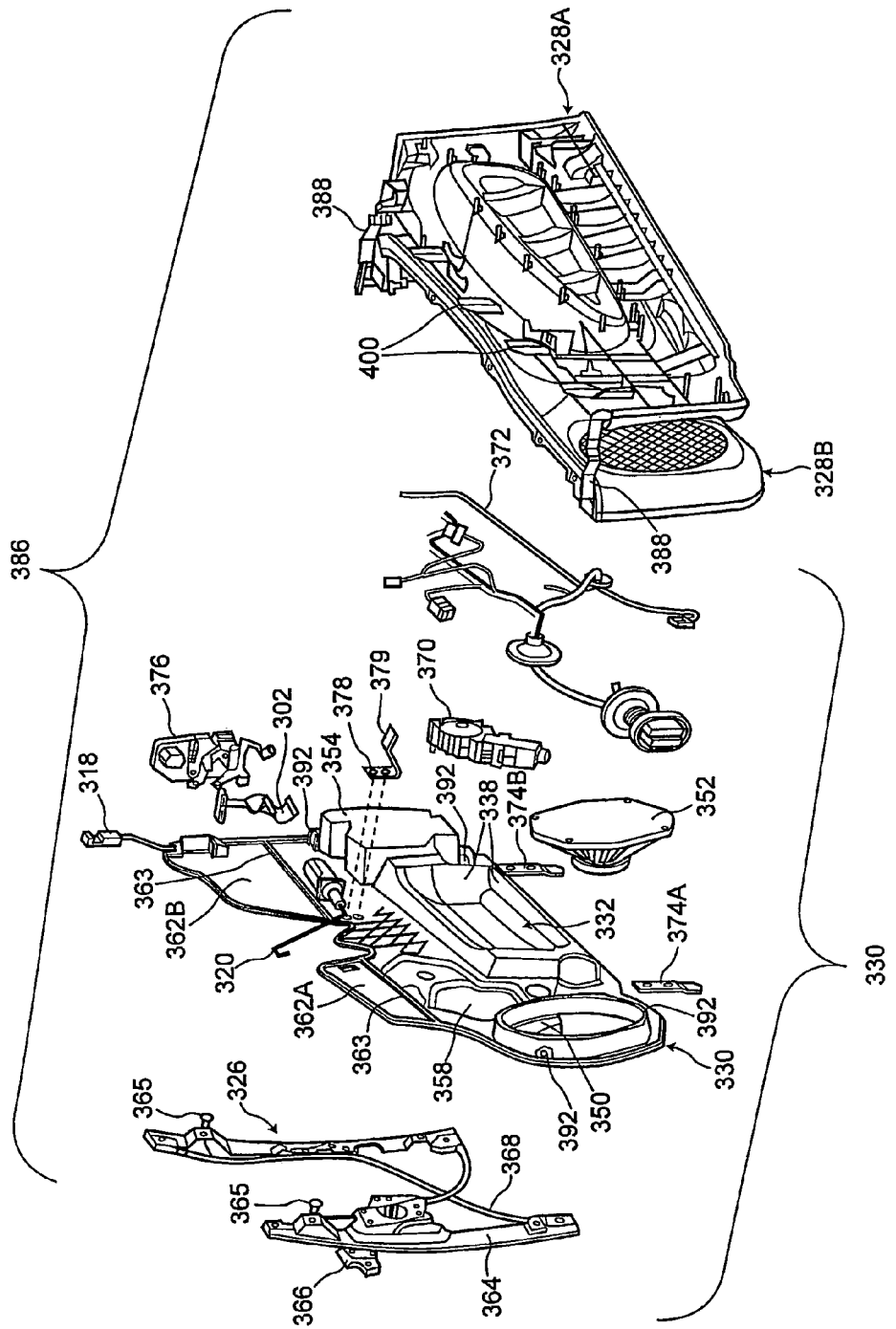

FIGS. 19A and 19B are exploded views of a door module 386 comprising a secondary trim/hardware carrier component 330 (referred to as "carrier" 330, for brevity) and upper and lower interior trim panels 328A and 328B. In this embodiment, as described in greater detail below, the lower trim panel 328B is shipped affixed or pre-assembled to the carrier 330 and the upper trim panel 328A is articulated to the lower trim panel 328B thus avoiding the need to lift or carry the components independently during assembly to the structural door body.

More particularly, carrier 330 includes the following integrally molded or formed components:
- a map pocket body 332, including a shelf structure 338, having a class A finished surface;
- a speaker housing 350;
- a side impact energy absorption structure 354, comprising a lattice of integrally molded ribs 356 (see FIG. 19A);
- a motor and cable drum mounting receptacle 358;
- a latch presenter rail 304 (see FIG. 19A); and
- at least one flap 362 provided by "living" hinge 363, the illustrated embodiment having two such flaps 362A and 362B.

The secondary trim component 330 carries preferably all of the hardware components required for the typical vehicle door. These include:
- a window regulator, generally designated by ref. no. 326, which includes one or more rails 364 having bolts 365 partially installed therein, lift plates 366 and interconnecting drive system 368 including motor and cable drum 370;
- a wiring, harness 372, which is attached to the secondary trim component 330 via integrally formed clips (not shown);
- a lock assembly 318;
- an inside release rod 320;
- a speaker 352;
- a latch 376 mounted to the secondary trim component via a latch presenter 302, as previously described; and
- a flexible water sealing bead 380 which may be provided as previously described.

In addition, brackets 374A, 374B are bolted to the window regulator rails 364. Another bracket 378, comprising orthogonal extension 379, is also mounted to the carrier 330 using conventional fasteners. The purpose of these brackets is described in greater detail below.

Figure 20:
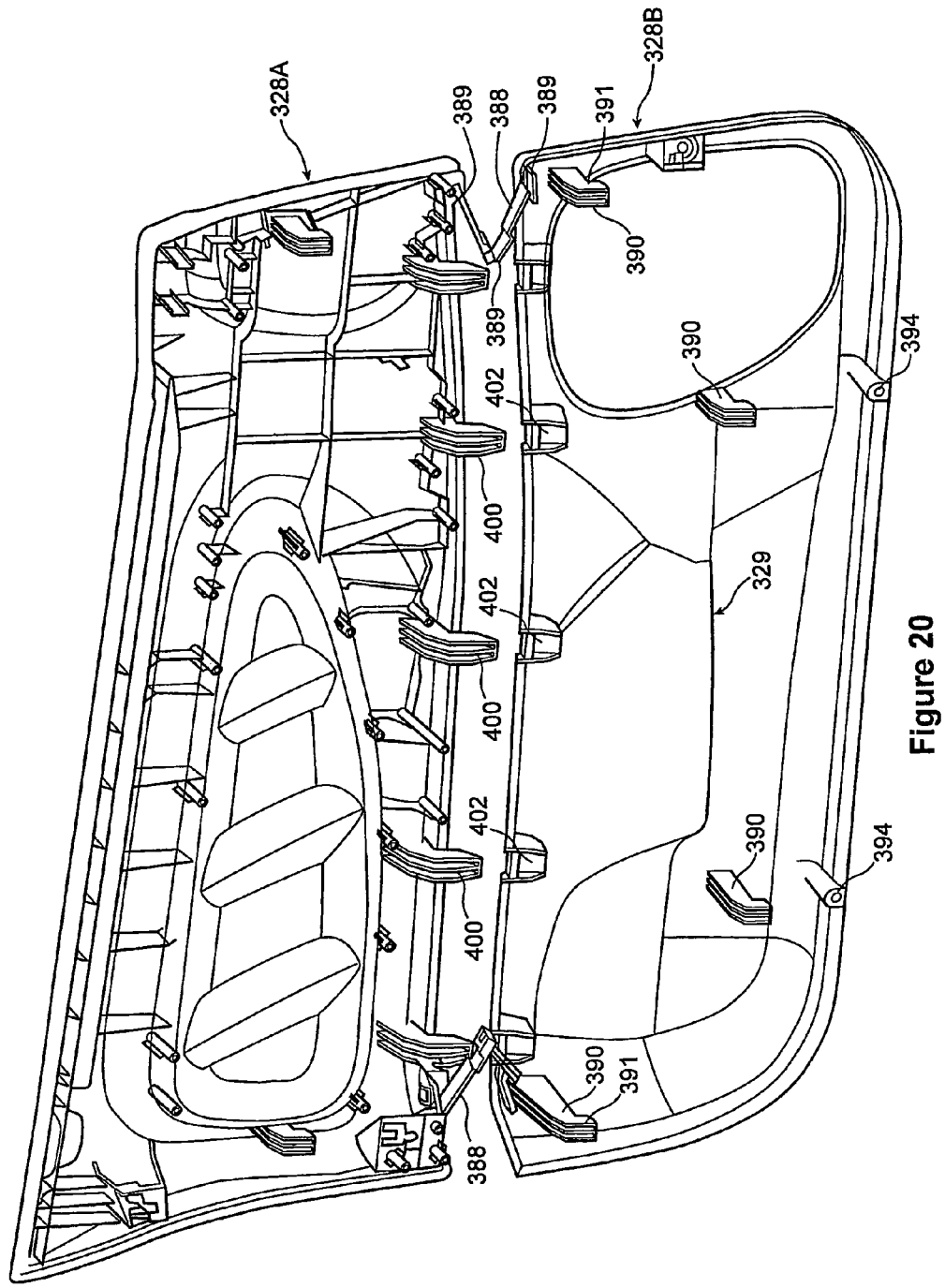
FIG. 20 is a rear perspective view of separated upper and lower trim panels according to the third embodiment.

Referring additionally to FIG. 20, the lower trim panel 328B has a map pocket opening 329 which, when aligned with the upper edge of the shelf structure 338 on carrier 330, co-operatively defines a map pocket.

Figure 21:
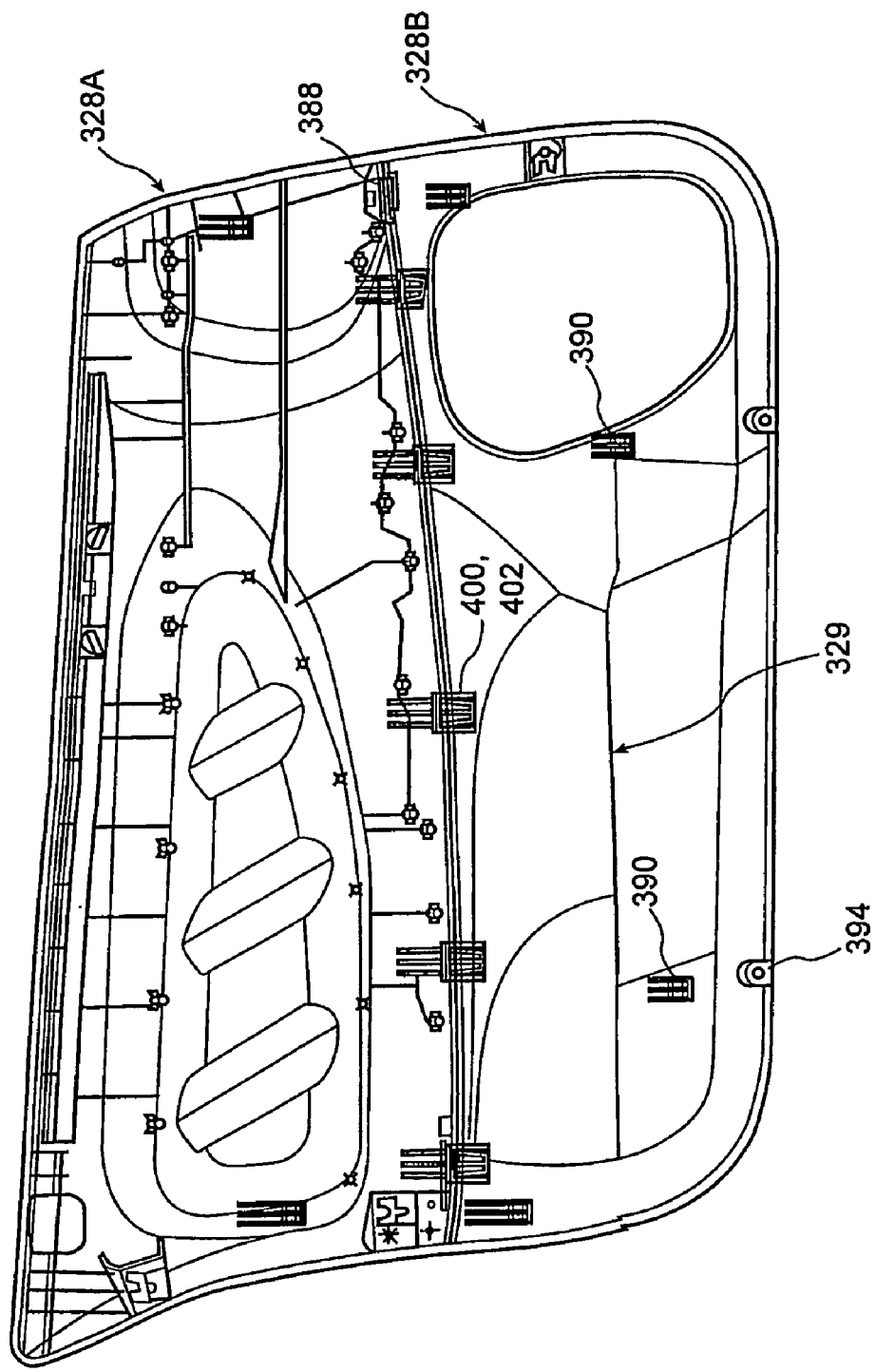
FIG. 21 is a rear elevation view of joined upper and lower trim panels according to the third embodiment.
Figure 25:
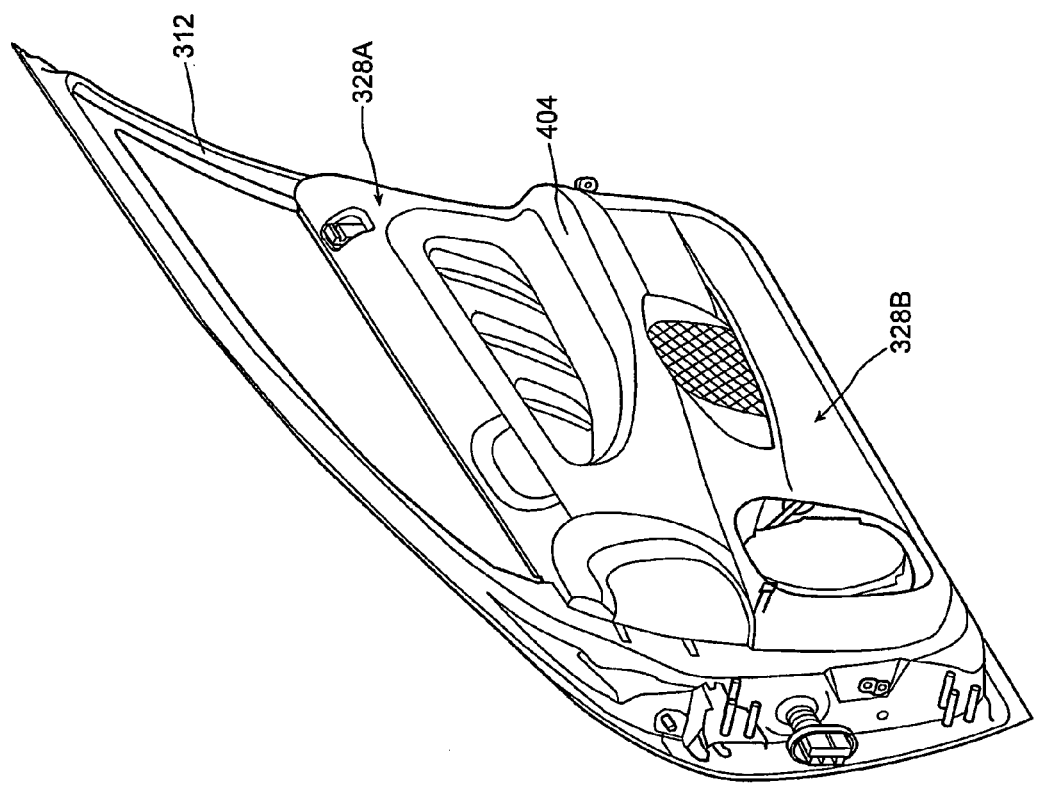
FIG. 25 is a perspective view of the door module according to the third embodiment fully installed on the structural door body shown in FIG. 18.

In this embodiment, the upper trim panel 328A is joined, and more preferably articulated to the lower trim panel 328B via hinges 388. The hinges 388 are preferably formed from plastic and fastened to the upper and lower trim panels at the secondary assembly plant. Each hinge 388 has fold lines at 389. This enables the upper trim panel to rotate about 180 degrees from a folded shipping position shown in FIGS. 19A & 19B (see also FIGS. 22 & 23), where the upper trim panel is co-located parallel to and suspended from the lower trim panel, to a vertical position shown in FIG. 20, where the upper trim panel is inline with but above the lower trim panel, and finally to an installed position, where the two trim panels are flush and interconnected as shown in FIGS. 21 & 25. In the installed position, the hinges 388 fold out of the way enabling the upper trim panel 328A to overlap the carrier 330.

Figure 22A:
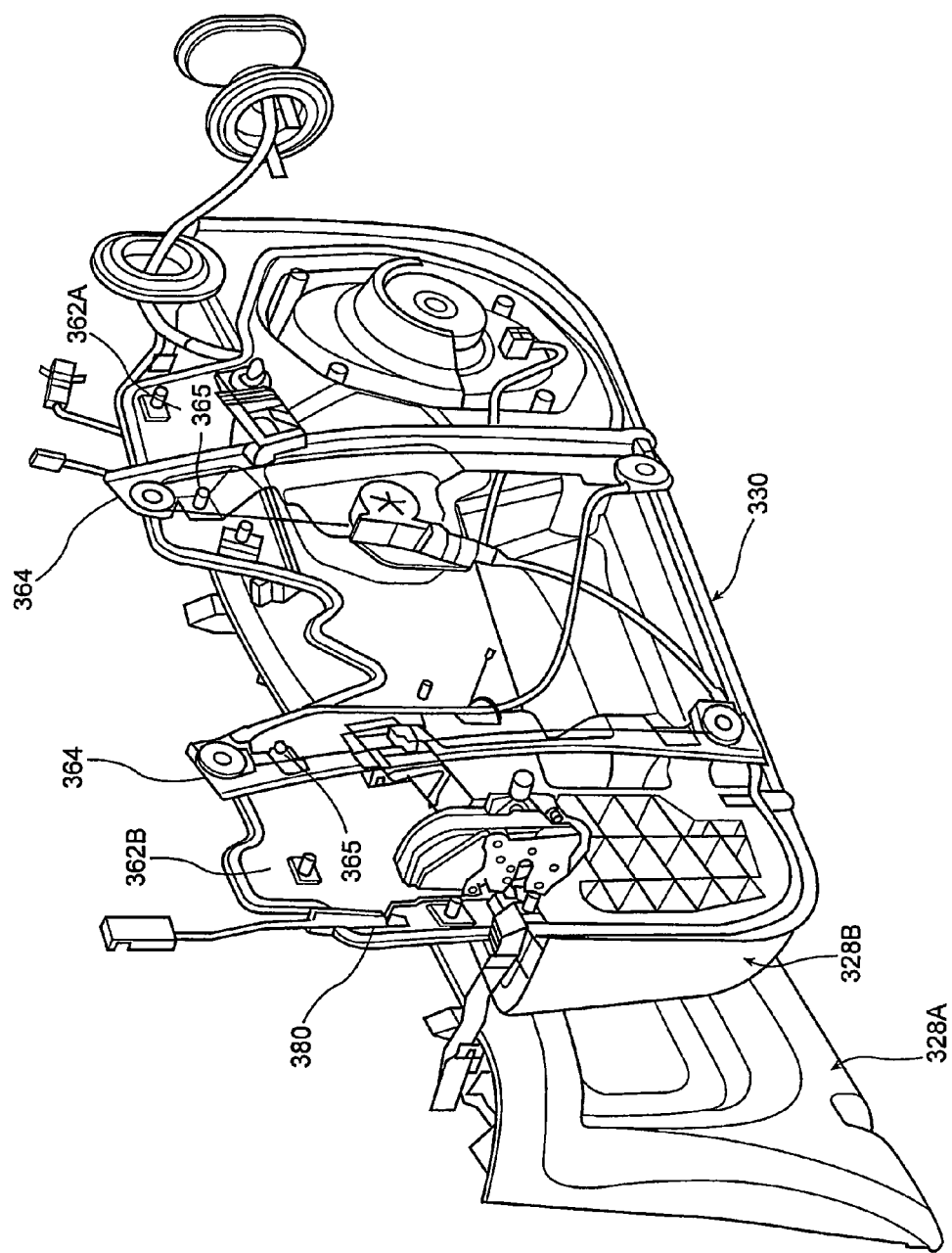
FIGS. 22A and 22B are perspective views, taken from opposing angles, of a complete door module according to the third embodiment.
Figure 22B:
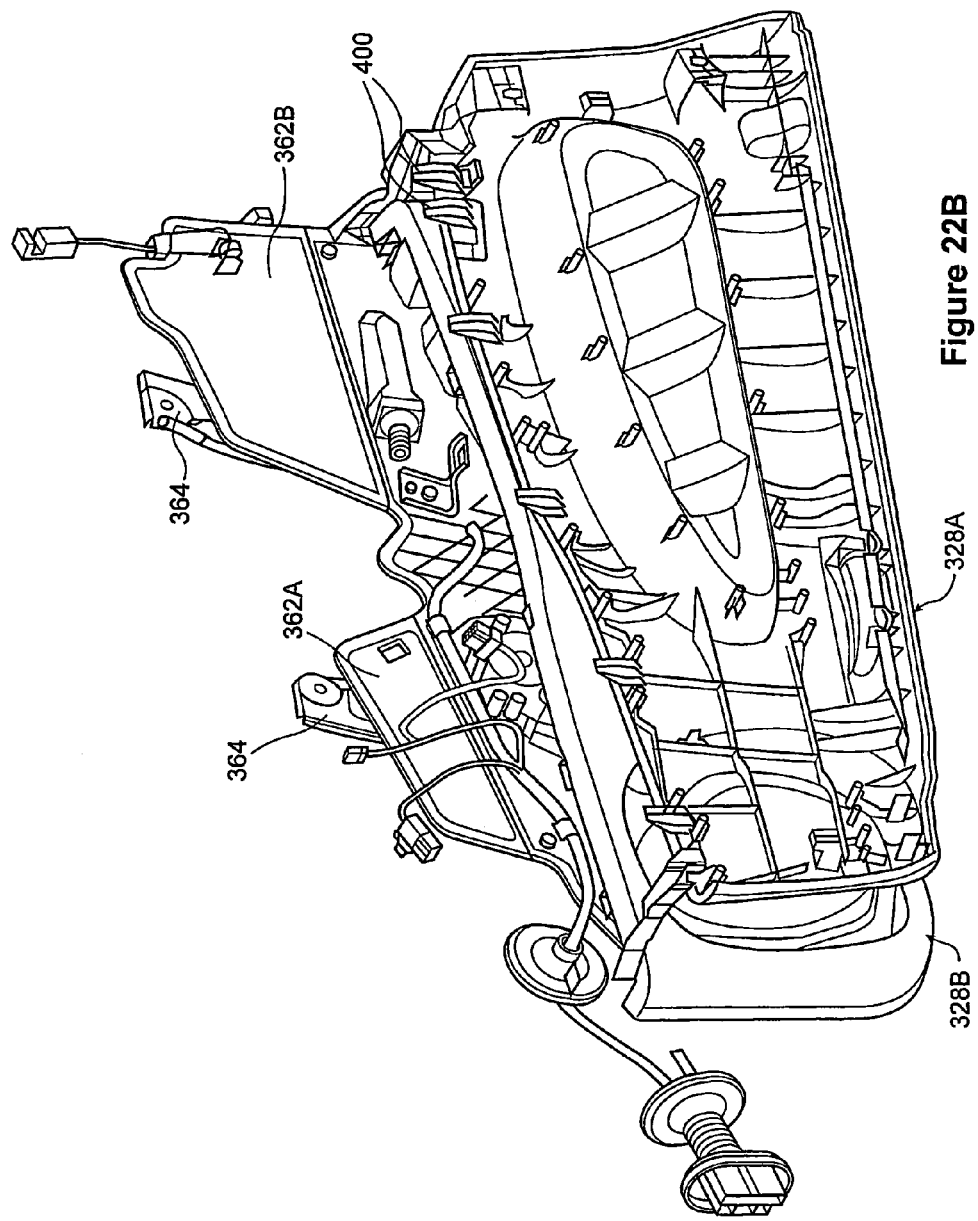
Figure 23:
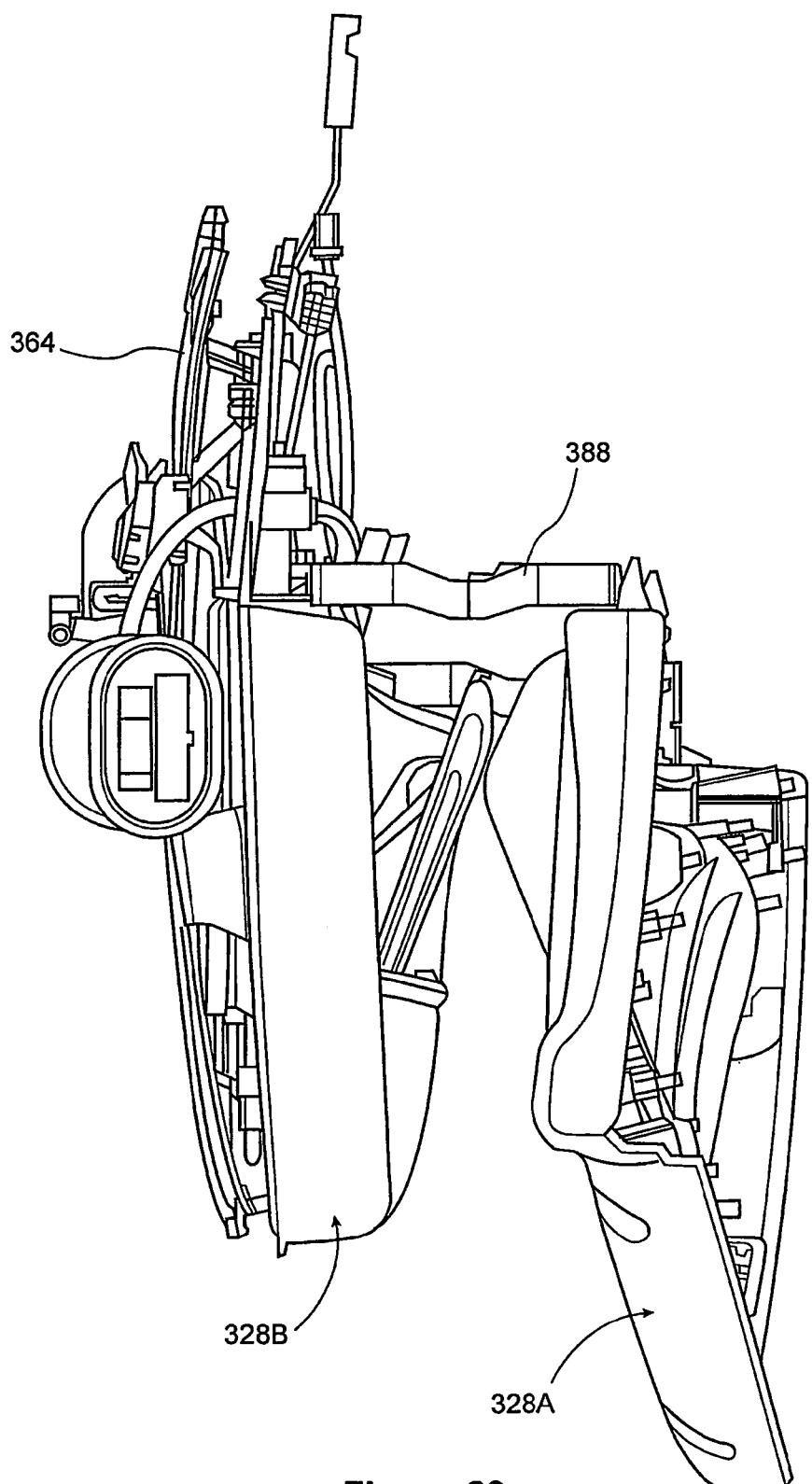
FIG. 23 is a side view of the door module shown in FIGS. 22A & 22B.

The lower trim panel 328B is fixed to carrier 330 at a secondary assembly plant, prior to assembly of the door module to the structural door body. The preferred means for interconnecting these components includes a plurality (preferably four) of hooks 390 integrally formed on the rear of the lower trim panel 328B. These hooks 390, which include integral side wedges 391, snap-fit into resiliently walled sleeves 392 (FIG. 19B) integrally formed on carrier 330, thus locking the two components together. With the hardware assembled onto the carrier 330 and the lower trim panel mounted 328B to the carrier, the hardware module 386 forms a single transport unit shippable from the secondary assembly plant to the OEM plant. FIGS. 22A and 22B show the transport unit in opposing perspective views, and FIG. 23 is an end view of the transport unit. As indicated previously, providing all the door hardware and trim in a single transport unit considerably reduces handling and assembly operations.

Figure 24:
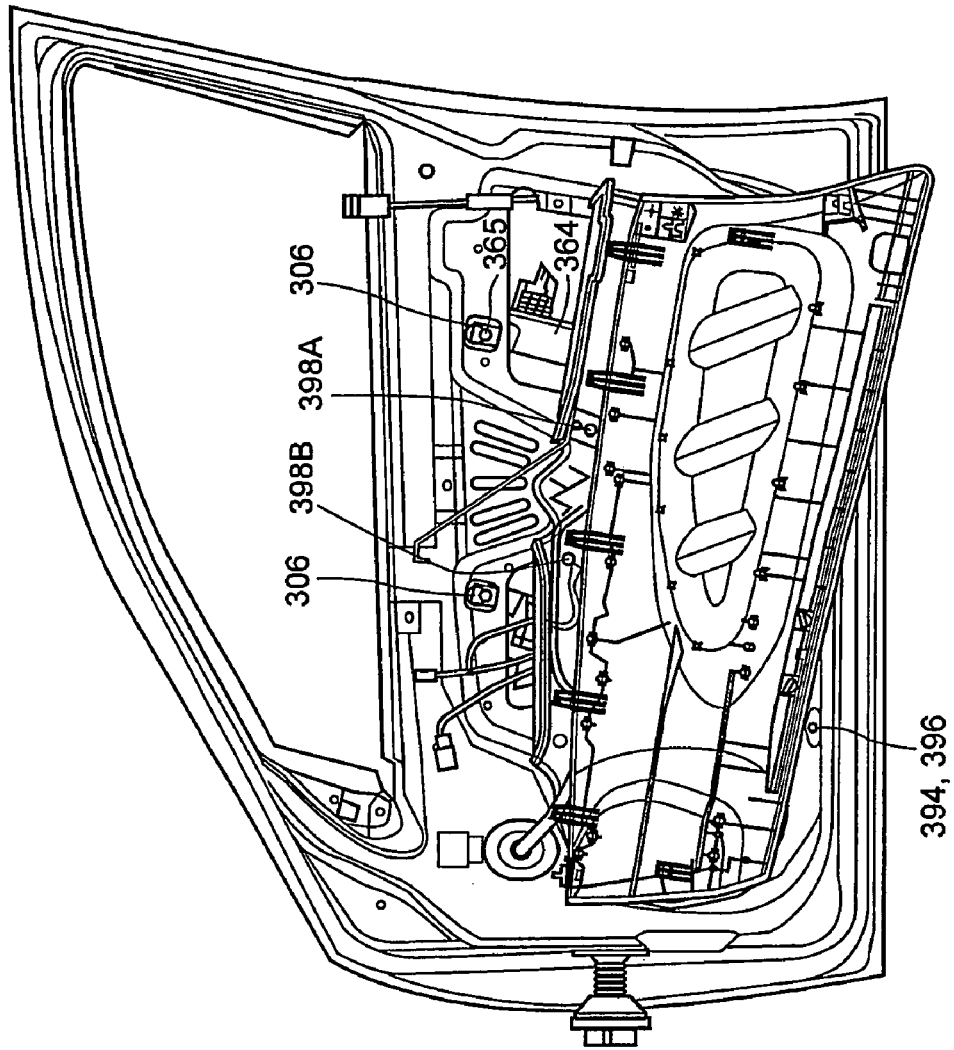
FIG. 24 is a front elevation view of the door module of the third embodiment partially installed on the structural door body shown in FIG. 18.

The door module 386 is mounted to the structural door body 312 as follows. Moving flaps 362A, 362B out of the way, the installer first slides the top of the window regulator rails 364 into the access holes 342A, 342B of the inner sheet metal layer 316 and inserts the loosely fitted bolts 365 of the window regulator rails 365 into the keyholes 306. Once this is accomplished the weight of the door module 386 is carried by the structural door body, as shown in FIG. 24, which is supported by the vehicle. The keyholes 306 allow the door module 386 to be manipulated so as to enable the installer to bolt the lower portion of the lower trim panel 328B to the structural door body 312. Preferably, two bolts (not shown) are passed through guide conduits 394 (FIG. 19A) integrally formed in panel 328B to mount the panel and brackets 374A, 374B against the inner sheet metal layer 316 via threaded holes 396 (FIG. 18) formed therein. This orients the window regulator 326 and carrier 330 relative to the structural door body 312, including juxtaposing the water-sealing bead 380 against the plateau 310 of the inner sheet metal layer 316. After this step, the bolts 365 at the top of the window regulator rails 364 may be tightened down. In addition, as seen in FIG. 24, the carrier 330 is preferably bolted (not shown) to the structural door body 312 at location 398A, to fasten bracket 378 to platform 308, location 398B, to fasten motor 370 to tab 399 (FIG. 18) of the inner sheet metal layer, and at locations 398C, 398D, (FIG. 18) to fasten the speaker 352 to the inner sheet metal layer 316.

Next, various hardware connections may be made to other components of the door. For example, the latch presenter 302 may be actuated as previously described in order to move the latch 376 into position. An outside handle (not shown) and key cylinder (not shown) may be connected to the latch. The wiring harness 372 may also be fished through various holes in the structural door body 312, which will vary depending on the application. Once these connections are made, the flaps 362A, 362B are fastened to the inner sheet metal layer via releasable friction-fit fasteners 401 (FIG. 19A), as known in the art per se, which enable the flaps to be subsequently re-opened.

Next, the upper trim panel 328A is articulated to the vertical position, enabling the inside release handle on the panel to be attached to connecting rod 320. The upper panel 328A may then be moved to the installed position. To facilitate the smooth intermeshing of the upper and lower trim panels, the rear side of the upper trim panel 328A includes a series of integrally molded pyramid-like or frusto-pyramidical lugs 400 which seat in correspondingly shaped receptacles 402 integrally formed on the rear side of the lower trim panel 328B. The lower surface of the upper trim panel rests against a correspondingly shaped upper surface of the lower trim panel such that the trim appears to the observer as one continuous piece, as shown in FIG. 25. Note that the upper trim panel may subsequently be easily moved into a position which is distanced from the carrier 330, so as to enable access to various hardware components for subsequent servicing.

After the upper trim panel 328A is placed in the installed position, the integrally formed pull handle 404 (FIG. 25) is bolted (bolts not shown) to extension 379 of bracket 378 which, in turn, is fastened to platform 308 of inner sheet metal layer 316. The upper trim panel 328 may also be fastened to the inner sheet metal layer 316 or the carrier 330 at other locations, if desired. The number of such fastening points is, however, preferably minimized for ease of subsequent servicing operations.

Figure 26A:
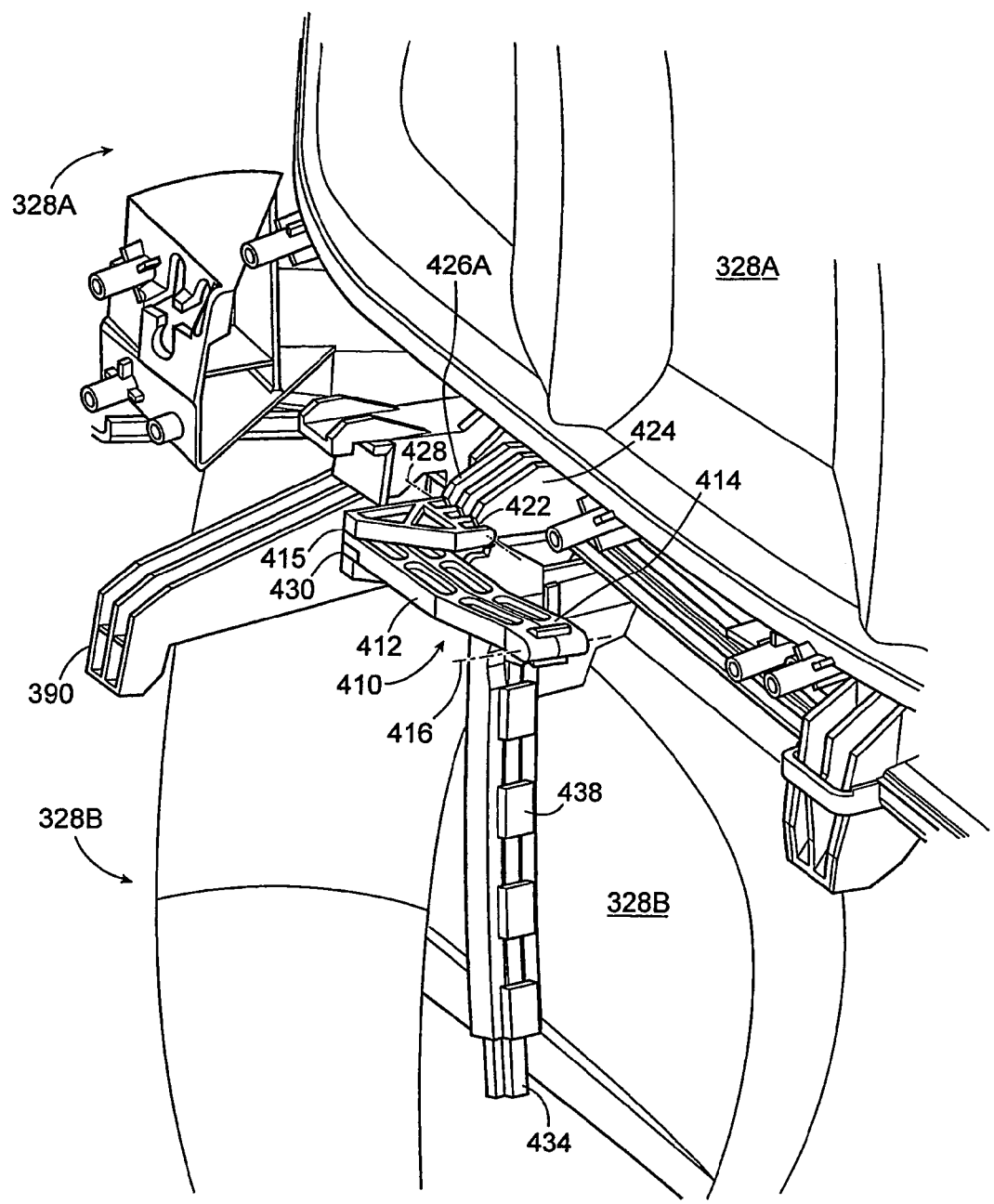
FIGS. 26A, 26B, and 26C are detailed perspective views of a preferred hinge structure, shown in folded and fully extended positions of operation.
Figure 26B:
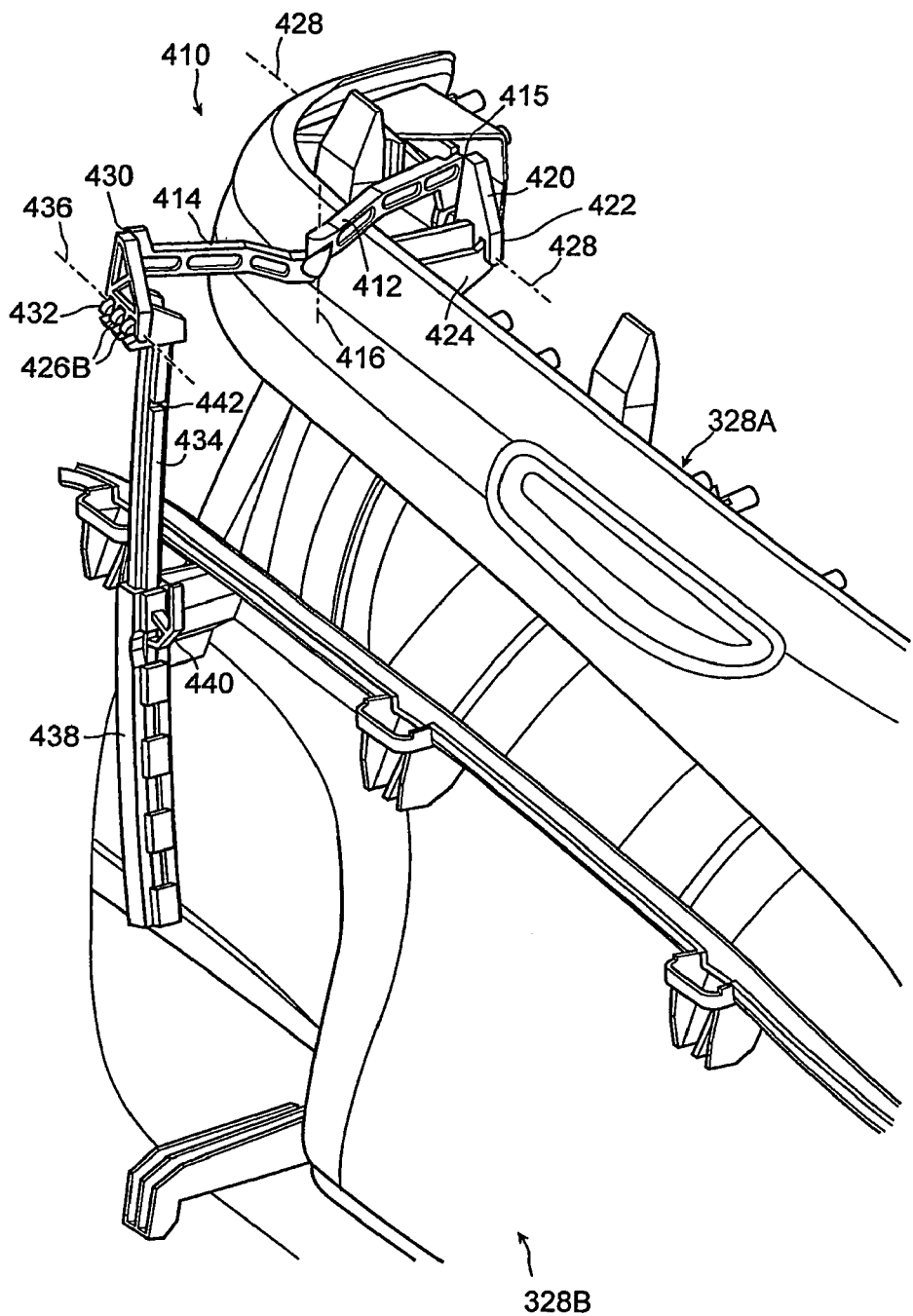
Figure 26C:
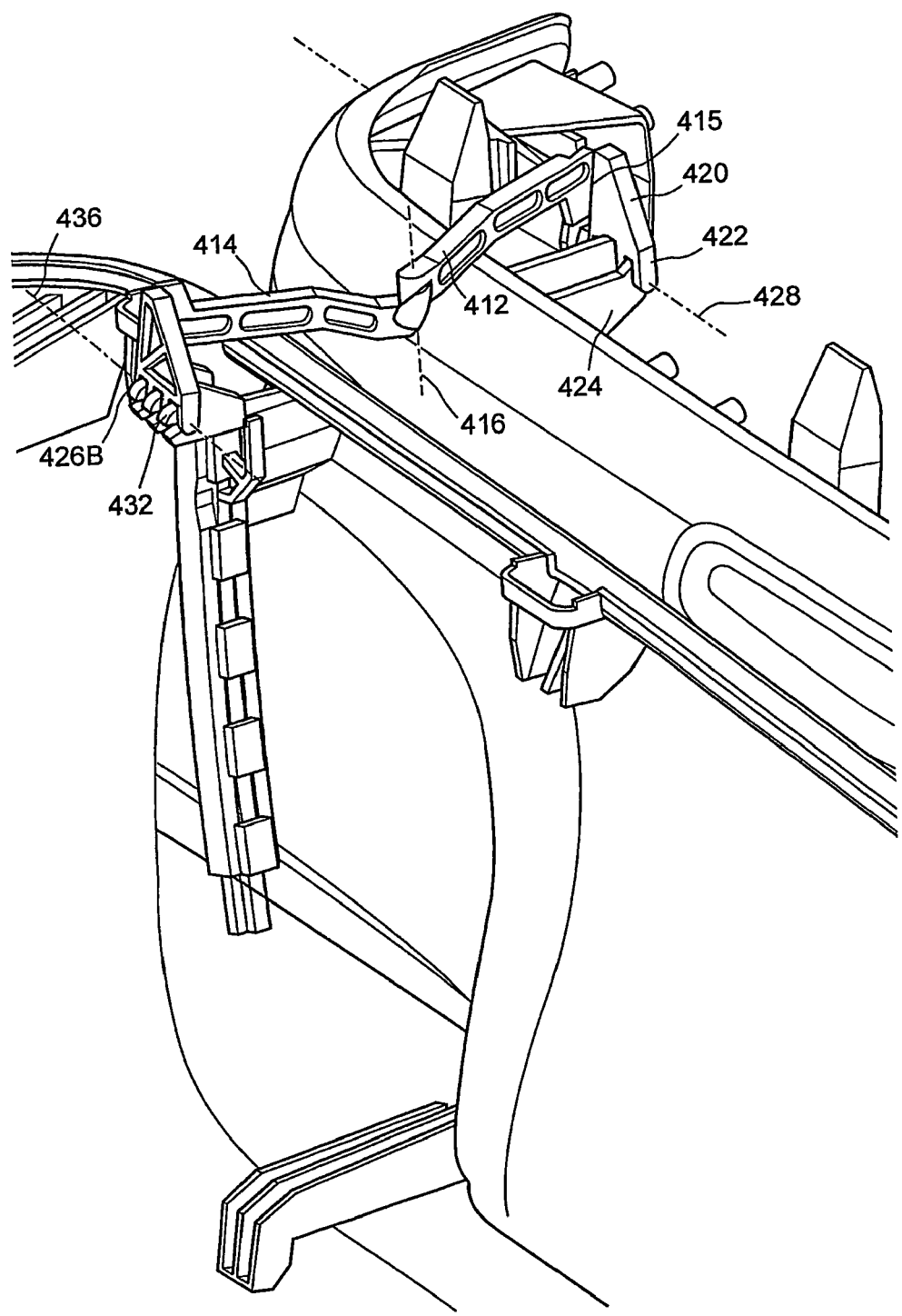

FIGS. 26A-26C show a preferred embodiment of a hinge 410 for articulating the upper and lower trim panels 328A, 328B. The hinge is shown in these drawings in various positions of operation from a folded position in FIG. 26A to a fully extended position in FIG. 26C. Referring to these drawings, the hinge 410 comprises a pintle member 412 and a gudgeon member 414 which provide pivotal motion about axis 416. The pintle member 412 has a fold line at 415 and includes a shoe 420 having axle 422. The shoe 420 is rotatingly interdigitated with a base member 424 that terminates in a plurality of hook-shaped projections 426A in which axle 422 is seated, thus enabling the pintle member 412 to pivot about axis 428, which is orthogonal to axis 416. The base member 424 depends from, and is preferably integrally formed with, the upper trim panel 328A. Similarly, as seen best in FIG. 26B, the gudgeon member 414 includes a fold line at 430 and is rotatingly interdigitated with the hook-shaped head 432 of an extension member 434, thus enabling the gudgeon member 414 to pivot about axis 436. As seen best in FIG. 26B, the extension member 434 slides in a sheath 438 preferably integrally formed with the lower trim panel 328B. This enables the trim panels to translate vertically with respect to one another. A releasable clip provided by a moveable cog 440 and a notch 442 cut into the extension member 434 maintains the extension member 434 in its sheath 438 when the hinge 410 is in its folded position. Note that hinge components 412, 414 and 434 are readily inter-connectable and may be molded separately from the trim panels for subsequent installation thereon.

The invention has been described in an illustrative manner. It is to be understood that the terminology that has been used is intended to be in the nature of words of description rather than of limitation. Many modifications and variations of the invention are possible in light of the above teachings. Therefore, the invention may be practiced other than as specifically described.

We claim:

1. A motor vehicle door comprising:
   inner and outer sheet metal layers joined together at their peripheries to define a cavity therebetween, said inner sheet metal layer having at least two access holes therein providing access to said cavity and having an intervening surface between said at least two access holes; and
   a door handle fastened to said intervening surface of said inner sheet metal layer;
   said intervening surface including a plurality of vertically-orientated ribs substantially covering the entire area of said intervening surface;
   wherein said inner sheet metal layer includes a continuous, closed loop plateau defining a flat surface surrounding each of said at least two access holes for sealingly mounting a secondary component to the door.

2. A motor vehicle door according to claim 1, wherein said closed loop plateau includes a W-shaped portion formed in said intervening surface between said at least two access holes for preventing the presence of a laterally extending surface therebetween.

3. A motor vehicle door according to claim 1, wherein said inner sheet metal layer includes a platform formed in said intervening surface for structurally supporting said door handle.

* * * * *